United States Patent [19]

Trawick et al.

[11] Patent Number: 5,125,008
[45] Date of Patent: Jun. 23, 1992

[54] METHOD AND APPARATUS FOR AUTORANGING, QUADRATURE SIGNAL GENERATION, DIGITAL PHASE REFERENCE, AND CALIBRATION IN A HIGH SPEED RF MEASUREMENT RECEIVER

[75] Inventors: Charles D. Trawick, Tucker; Owen M. Caldwell, Dunwoody, both of Ga.

[73] Assignee: Scientific-Atlanta, Inc., Atlanta, Ga.

[21] Appl. No.: 491,186

[22] Filed: Mar. 9, 1990

[51] Int. Cl.$^5$ .............................. H04B 1/10
[52] U.S. Cl. ............................ 375/102; 375/39; 375/98
[58] Field of Search .......... 375/39, 98, 102, 7, 375/8, 10, 106; 455/234, 304; 329/320; 324/76, 77 R

[56] References Cited

U.S. PATENT DOCUMENTS

| | | | |
|---|---|---|---|
| 3,950,750 | 4/1976 | Churchill et al. | 343/5 |
| 4,464,723 | 8/1984 | Chartier | 375/98 |
| 4,864,244 | 9/1989 | Sasaki | 375/39 |
| 4,926,443 | 5/1990 | Reich | 375/39 |
| 4,980,648 | 12/1990 | Jaeger et al. | 325/98 |
| 4,991,164 | 2/1991 | Casiraghi et al. | 375/98 |
| 4,991,184 | 2/1991 | Hashimoto | 375/8 |

OTHER PUBLICATIONS

Jung et al., "Modem-Circuit Techniques Simplify Instrumentation Designs", Electronic Design News, vol. 29, No. 16, Aug. 9, 1984, pp. 165-176, 178. (Abstract only).
Scientific Atlanta, description of Scientific-Atlanta Series 1780 programmable Microwave Receiver, "Antenna and RCS Instrumentation Products", 1990, pp. 38-50.
Scientific Atlanta, description of the Model 1795 microwave receiver, "Antenna and RCS Instrumentation Products", 1990, pp. 51-55.
Scientific-Atlanta, "Highspeed Measurement Receiver Improves Antenna Range Productivity", Microwave Journal, Mar. 1989, vol. 32, No. 3, pp. 163-170.
Churchill et al., "The Correction of I and Q Errors in a Coherent Processor", IEEE Trans. Aerospace and Electronic Systems, vol. AES-17, No. 1 (Jan. 1981), pp. 131-137.
Operating and Service Manual for the HP8510 Network Analyzer, pp. 8-275/8-276, pp. 8-241/8-242 (date unknown, but more than one year before filing date hereof).
Maintenance Manual for the Scientific Atlanta Series 1780 Programmable Microwave Receiver, Part I (1984), pp. 4-85-4-90.
Oliver and Cage, "Chopper Amplifiers", Electronic Measurements and Instrumentation, pp. 204-209, McGraw-Hill Book Company (1971).

Primary Examiner—Stephen Chin
Attorney, Agent, or Firm—Jones, Askew & Lunsford

[57] ABSTRACT

Improved autoranging, calibration, and complex signal detection circuits for an intermediate frequency (IF) stage in a radio frequency (RF) measurement receiver. An improved autoranging circuit sets a gain stage of a selectively variable gain amplifier prior to each data acquisition cycle, to provide for wide dynamic range and rapid time domain response. An improved complex signal detection circuit for generating an inphase (I) and quadrature phase (Q) signal from an input IF signal in a signal channel and a reference channel is constructed with a novel commutating demodulator circuit. Calibration is effected with an improved digital phase reference method and apparatus wherein effectivr 90° phase shifts are digitially generated by shifting the generation sequence of timing signals for the complex signal detection circuit instead of phase shifting a known calibration signal, obviating the need for precision phase shifters, Doppler frequency generators, or Fourier transforms to obtain correction components for the optimum detection of complex signals.

51 Claims, 11 Drawing Sheets

FIG. 1  Receiver Block Diagram—Antenna Test Application

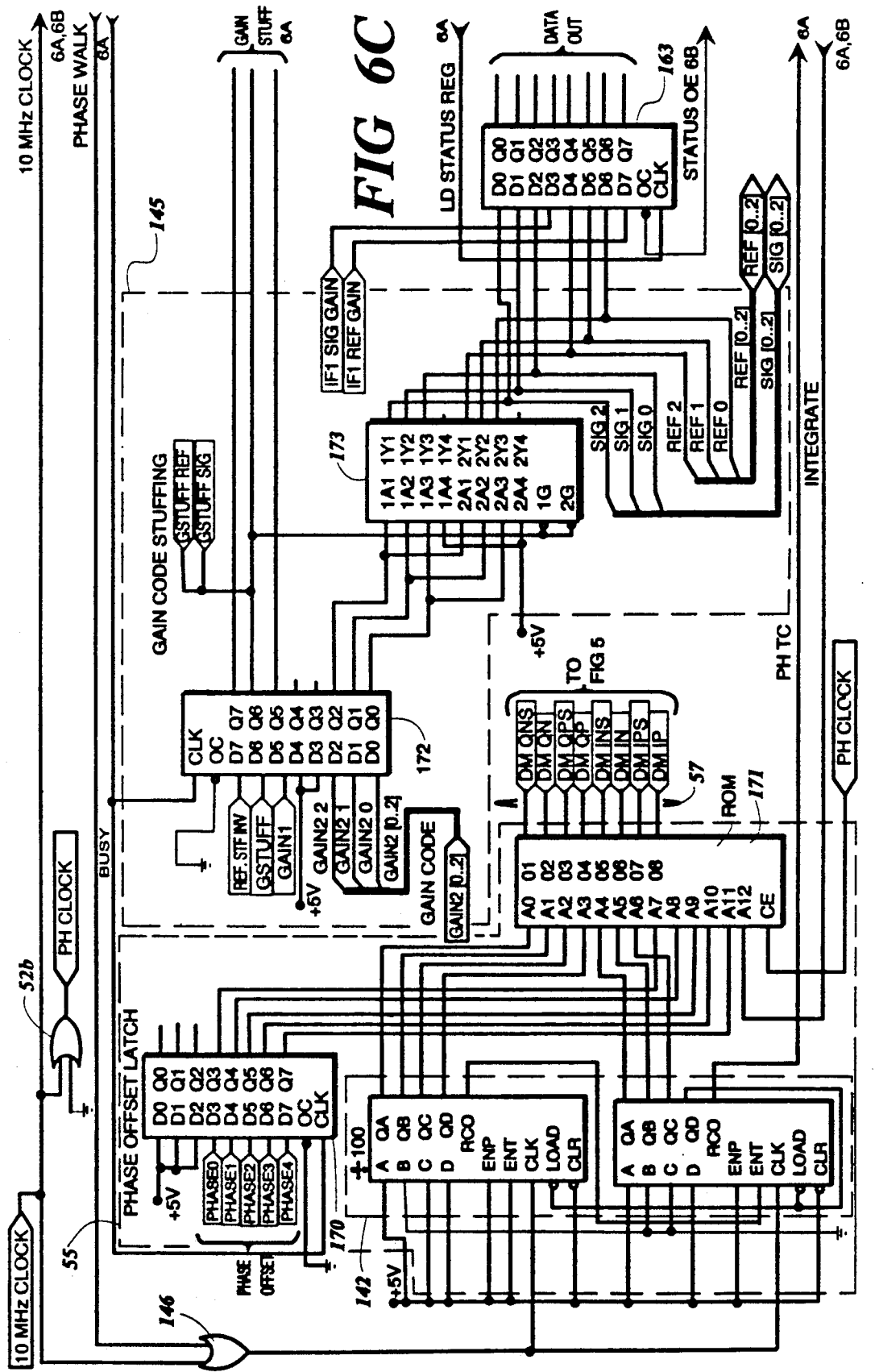

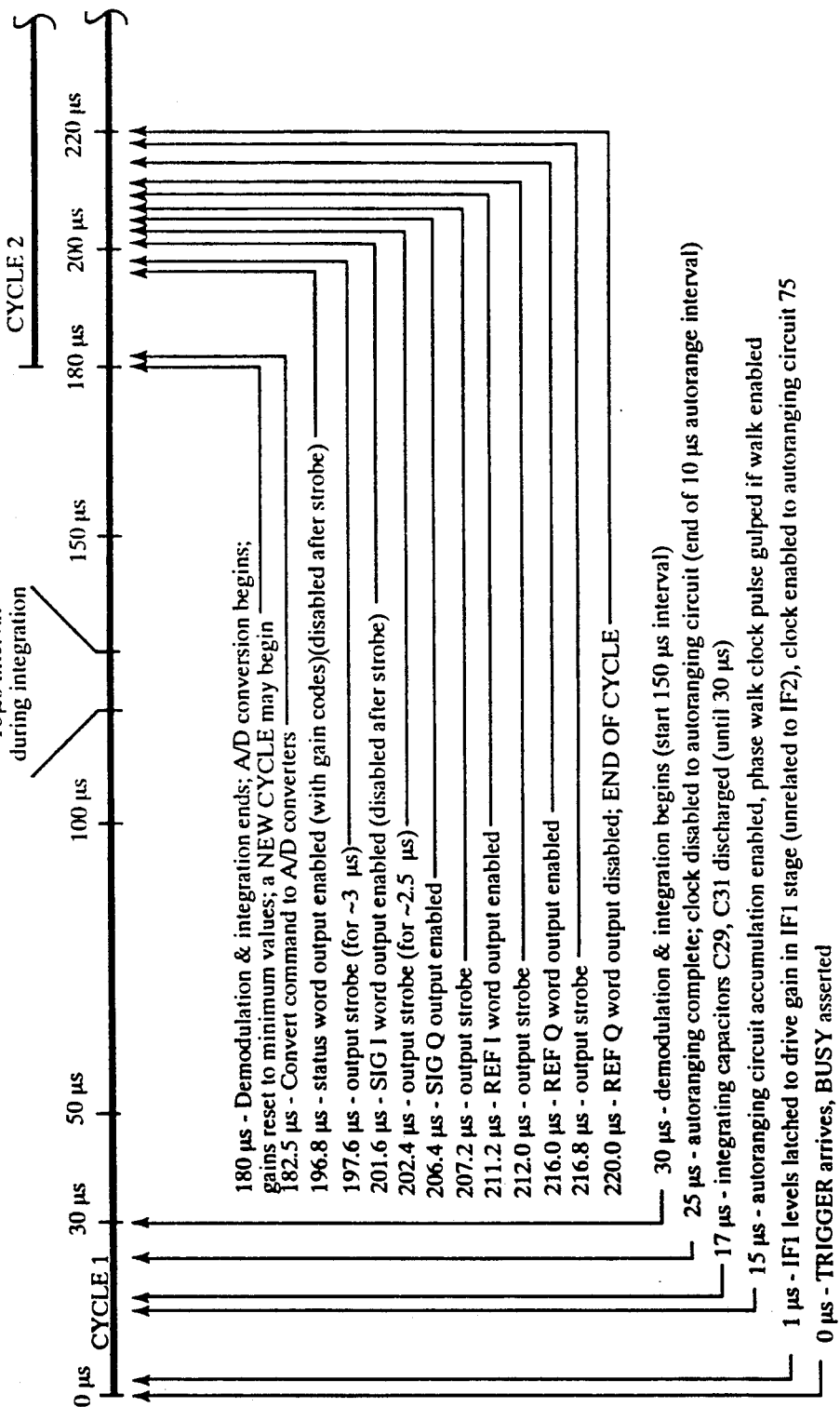
FIG. 7    Timeline of Events and Times within an Acquisition Cycle

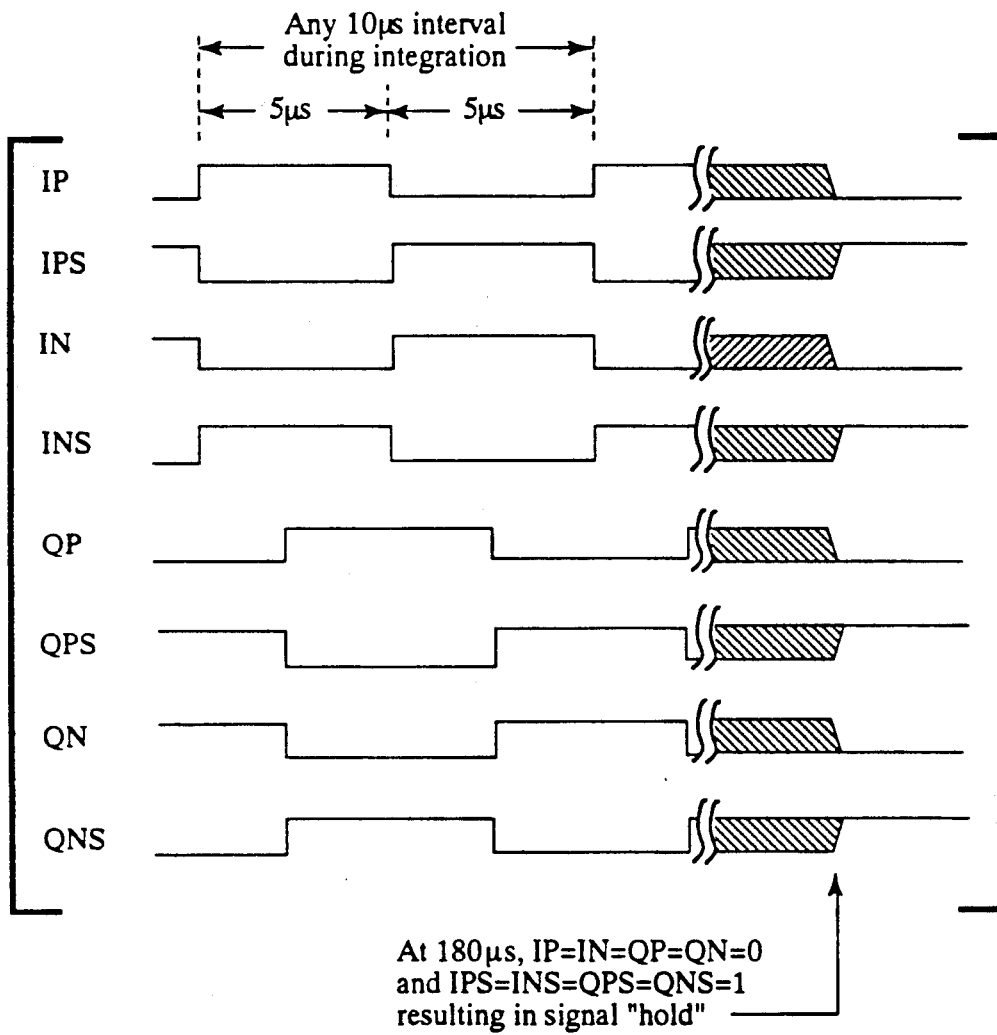
FIG. 8  Typical Timing Interval During Integration

METHOD AND APPARATUS FOR AUTORANGING, QUADRATURE SIGNAL GENERATION, DIGITAL PHASE REFERENCE, AND CALIBRATION IN A HIGH SPEED RF MEASUREMENT RECEIVER

TECHNICAL FIELD

The present invention relates generally to radio frequency (RF) receivers, and relates more particularly to improvements for the intermediate frequency (IF) stages in a RF measurement receiver particularly useful for measuring the RF and microwave performance characteristics of antennas, components and materials.

BACKGROUND

Modern microwave radar and communication systems rely heavily on the performance characteristics of antennas. Continuing advancements in antenna design have resulted in improvements in these systems and have challenged instrumentation manufacturers to provide instruments that can accurately measure the performance characteristics of new antenna designs, such as multibeam antennas, electronically steered phased arrays, dual-polarized and shaped-beam reflectors, and low sidelobe and broadband omnidirectional antennas.

Antenna testing is a multidemensional measurement problem. The received signal from an antenna under test ("AUT") is a phasor quantity. It is a function of the antenna's frequency, beam position for steered-beam arrays, polarization, spatial position (such as azimuth and elevation angles), and other parameters. The received signal's amplitude and phase components are principal parameters of operation which are recorded as a function of position and other pertinent test parameters such as frequency and polarization.

It is believed that improvements in antenna range productivity may best be achieved by enhancing receiver performance characteristics. The major receiver characteristics affecting antenna measurements include measurement speed, frequency agility (the ability to change frequencies rapidly); dynamic range, interface compatibilities with computer-controlled systems, the number of measurement channels, and remote control capability.

The time required to take an individual measurement is governed primarily by a measurement receiver's acquisition speed. Measurement speed is the the rate at which a receiver can acquire, process, and output formatted data. The apparent speed of many conventional receivers is usually fast enough that the measurement processing time is transparent to an operator. However, actual receiver speed becomes apparent when repetitive tasks are performed, such as in multifrequency or multiported measurements wherein the frequency can be changed more rapidly than measurements can be processed and provided as outputs.

Fast, coherent, wideband measurements require that a receiver remain phase-locked to the transmit source at all times. A receiver's frequency agility characterizes its ability to maintain phase-lock when encountering rapid frequency transitions.

Receivers must also provide sufficient dynamic range for the required measurement accuracy. Current ultra-low sidelobe antennas have sidelobes in the −60 dB range, which may require a dynamic range of 80 dB or more for acceptable accuracy. When measurement speed is an overriding factor, the receiver's dynamic range may be compromised in exchange for speed. Also, receivers require interfacing to other measurement subsystems to produce outputs such as antenna radiation patterns.

Particular problems have been encountered in the design of measurement receivers which provide an acceptable response time, frequency agility, and dynamic range. For example, it is known that the signal level can suddenly change in a measurement environment, as when the transmit antenna's polarization shifts from horizontal to vertical polarization. The sudden signal level change can result in overranging of the circuitry and inaccurate measurements unless the dynamic range and response time are sufficient to handle the change and can change quickly enough to preserve the measurement opportunity.

One known method for adapting to signal level changes may be referred to as the "dual-cycle" autoranging approach. In this method, the signal level from the previous cycle is used to set the gain level for a current cycle. This approach has the inherent disadvantage that there is risk of loss of data if the signal level changes abruptly between measurement cycles.

To avoid the latency resultant in dual-cycle autoranging, another known autoranging approach sets the gain stage for each measurement cycle based upon the incoming signal level. This method, which may be termed the "long-cycle" approach, involves lengthening the measurement cycle to allow for settling of the signals through the circuitry. Thus, this method has the disadvantage that the measurement cycle is necessarily lengthened, which affects overall measurement speed and bandwidth.

Calibration of measurement receivers is also of a critical importance in antenna testing. Calibration of a receiver entails providing a reference signal (which may originate in a local oscillator unit associated with a test range), typically at full scale and at a known phase, and measuring the effect which the various circuits in the receiver may have on the reference signal. Corrections for detected errors are then provided. During calibration, the reference signal is typically imposed upon both the signal channel and the reference channel of the receiver, both of which must be independently calibrated. In addition to measuring gain effects, the phase of the signals in both channels must be measured and corrected, if necessary, so as to cause measurement values during operation to be expressed relative to a calibrated signal. Often, measurement values are expressed in complex signal form, with an inphase component (I) and a quadrature component (Q), which are 90° out of phase with respect to each other.

In particular, three error types typically occur in phase/amplitude measurement receivers utilizing complex signal detection circuits: (1) offset errors, that is, fixed values which must be added to the inphase or quadrature outputs of the receiver channel, (2) orthogonality errors, that is, deviation of the inphase and quadrature reference signals from being exactly 90° out of phase with respect to each other, or deviation of the phase shifts in the inphase and quadrature sides of the demodulator from each other, and (3) gain errors, that is, a discrepancy in the gain of the inphase signal path as compared to the quadrature signal path.

In one known prior art approach to the calibration problem for a complex signal measurement circuit, U.S. Pat. No. 3,950,750 to Churchill et al., a calibration reference signal is generated with a slight frequency offset, causing its phase to continuously vary during the calibration process. The phasor output of the complex signal circuit is sampled at appropriate intervals, and a fast Fourier transform (FFT) is performed on the resulting data. The result of the FFT is used to generate correction coefficients for application to signals passing through the complex signal circuit. However, this approach relies upon precise timing of the samples with respect to the phase of the frequency offset reference signal, plus the added computational complexity attendant to the FFT algorithm.

Another similar prior art approach eliminates the timing constraints by using switchable phase shifting elements within a calibration reference signal generator. However, this technique relies heavily upon the precision and constancy of the phase shifting hardware. Controllable phase shifts of the precision required for accurate antenna measurement applications are difficult and expensive to achieve.

Accordingly, there is still need for further improvements in radio frequency receivers used in radar, antenna, components, and materials testing, and communications applications, namely, in methods for calibration, complex signal generation, autoranging, and the like, at lower cost but with improved performance.

SUMMARY OF THE INVENTION

Briefly described, the present invention comprises improvements in the intermediate frequency (IF) stages of a radio frequency measurement receiver including a novel complex signal demodulator circuit and method, an improved autoranging circuit and method for providing rapid response over a wide dynamic range, an improved digital phase reference apparatus and method which facilitates calibration of the receiver by shifting the phase of the reference signal used in the demodulator instead of providing a phase shifter at the front end of the system, and improvements in the topology of a commutating demodulator which results in a more compact yet still precise circuit design.

More particularly described, the autoranging method and apparatus of the present invention comprises a digital autoranging circuit including a flash analog-to-digital (A/D) converter which produces digital samples of the input signal, an adder/accumulator which accumulates the absolute value of the digital samples, means responsive to the accumulated absolute value of the samples during an accumulation cycle, means for selecting a gain range for the input signal as a result of the accumulation cycle through selectivety variable gain stages, prior to providing the autoranged signal to subsequent signal processing stages. This approach avoids the known dual-cycle type of autoranging in which signal level information from one measurement cycle is used to set the input sensitivity for the next cycle. The present invention therefore overcomes limitations on latency imposed by the prior art dual-cycle approach, and permits potentially higher measurement speeds and response to changes in signal level than the prior art long-cycle approach, without losing data when the input level changes abruptly between measurement cycles.

Still more particularly described, the improved autoranging circuit provides for digital integration utilizing a read only memory (ROM) containing look-up math tables used to integrate the absolute value of the incoming signal. The output of the ROM is the sum of the previous output fed back from a holding register and the absolute value of the new output from the A/D flash converter. After a predetermined number of samples is accumulated, an autorange decision based on the number presented by the holding register is made. The integration interval may be either a half-cycle or a full cycle of the signal frequency (nominally 100 kHz). The integration of the absolute value for either one half or one full cycle of the signal frequency makes the result independent of the incoming signal's phase or of the starting time of the measurement.

Briefly described, the improved digital phase reference circuit and method of the present invention allows for improved calibration of a complex signal detection circuit, to correct for offset, gain, and orthogonality errors. The invention comprises means responsive to a calibration command for generating an IF (nominally 45 MHz) calibration reference signal. The calibration reference signal is provided as the input signal to the IF stage, and thence (after downconversion) to the complex signal detection circuit later in the IF stage, instead of as an RF signal to the front end of the receiver. Timing signal means, a ROM in the disclosed embodiment, generates timing signals for causing the complex signal detection circuit (a commutating demodulator in the preferred embodiment) to convert the input signal into an inphase output signal and a quadrature output signal. A phase offset signal means responsive to the calibration command provides a phase offset signal corresponding to a predetermined "effective" phase offset for the calibration reference signal. The phase offsets are preferably generated for effective phase shifts of 0°, 90°, 180°, and 270°.

Timing signal altering means responsive to the phase offset signal alters the timing of the timing signals for the complex signal detection circuit so that the complex signal detection circuit provides phase-offset inphase and quadrature phase output signals which are shifted in phase by an effective amount corresponding to the predetermined phase offset. The timing signal alteration is effected digitally and completely within the timing signal ROM, by providing the phase offset signal as additional address inputs to the ROM corresponding to a set of predetermined phase offsets.

After conversion to digital form, external means such as a microprocessor associated with the receiver calculates a calibration correction for gain and orthogonality for I and Q signals provided from the complex signal detection circuit, based on corrections derived from the phase-offset inphase and quadrature phase output signals generated during calibration.

Stated in other words, the ROM utilized as the memory for storing the timing signals for the complex signal detection circuit also stores a plurality of sets of timing signals, which are selected by the phase offsets. Each of the sets of timing signals are effectively phase-shifted with respect to a master cycle time, synchronized to the input IF signal, so that the complex signal detection circuit effectively shifts its operation in phase by an amount corresponding to a selected phase offset. In order to calibrate the receiver, a predetermined set of variations in the "effective phase" of the timing signals stored in the ROM are provided during a calibration operation. Calibration is then effected by measuring the known calibration reference signal which originates in a local oscillator unit associated with the receiver and measuring the effect of the various switchable gain stages used in autoranging on this reference signal, as modified by the various phase offsets.

A correction matrix is then computed for each state of the switchable gain stage, which, when multiplied by subsequent inphase and quadrature phase values, will remove the measured phase, orthogonality, and gain errors from the measurements. These matrix computations are preferably carried out in a digital signal processor associated with the receiver's control unit. The resulting corrected signals have a phase and amplitude which are referenced to the phase and amplitude of the full-scale calibration reference signal.

The present invention thereby provides means for correcting offset errors, that is, fixed values added to the inphase and quadrature phase outputs of the receiver channel, and for correcting orthogonality errors. (Inphase and quadrature offsets are corrected before the matrix multiplications, and do not vary with gain switching.) Those skilled in the art will appreciate that the known prior art calibration methods which involve phase-shifting and frequency shifting an RF calibration signal at the front end of the system during calibration, followed by FFT to extract the needed correction terms, are obviated, in that the present invention provides means for effectively shifting the calibration reference signal through phase offsets, with the results being combined to correct for all known error terms.

Briefly described, the preferred invention further relates to an improved commutating demodulator topology which is very exacting and provides demodulation operation more precise than prior art demodulators. The improved demodulator topology comprises memory means for storing timing or control signals (such as the ROM discussed above when the demodulator is used in a complex signal measurement application), synchronizing means for synchronizing the control signals provided from the memory with an accurate time reference, means for multiplying a phase reference signal by the signal to be demodulated by commutating switches, and means for directly driving the commutating switches from the synchronizing means, thereby avoiding further errors which would have arisen had additional buffering of the timing signals been required.

More particularly described, the improved commutating demodulator circuit is responsive to an input signal at a predetermined frequency for providing an output signal referenced to the phase of a known phase reference signal during a conversion cycle. A clock means provides a clock signal having a frequency n times higher than the predetermined frequency of the input signal. Locking means phase locks the clock signal to the reference channel input signal. A counter counts n cycles of the clock signal to define a single cycle of the input signal, allowing the control signals from the memory means to be synchronized with the reference channel input signal. The control signals comprise a positive switching signal, a negative switching signal, a positive shunt signal, and a negative shunt signal. The positive switching signal and the negative switching signal are 180° out of phase with respect to each other, and the positive shunt signal and the negative shunt signal are 180° out of phase with respect to each other. The positive shunt signal is always the logical inverse of the positive switching signal, and the negative shunt signal is always the logical inverse of the negative switching signal.

A first switching means responsive to the positive switching signal switches the input signal to an integrating node, while a second switching means responsive to the negative switching signal switches an inverted input signal to the integrating node 180° later in the cycle. Third switching means responsive to the positive shunt signal holds the input of the first switching means close to ground during the switching signal, while a fourth switching means responsive to the negative shunt signal holds the input of the second switching means close to ground during the switching signal. A synchronizing latch synchronizes all timing signals to the clock signal, which, it will be recalled, provides a stable phase reference.

Accordingly, it is an object of the present invention to provide an improved high speed RF measurement receiver for complex signals.

It is another object of the present invention to provide an improved calibration method and apparatus for radio frequency receivers, to allow correction of offset, gain, and orthogonality errors.

It is another object of the present invention to provide an improved commutating demodulator circuit topology which exhibits reduced output errors.

It is another object of the present invention to provide an improved topology for a commutating demodulator which results in reduced parts count while still avoiding errors which would have arisen had additional buffering of phase referenced demodulator timing signals been necessary.

It is another object of the present invention to provide an improved autoranging method and apparatus for use in RF and microwave measurement receivers which permits higher response speeds to dynamic complex signals without sacrificing dynamic range of the complex signal detection circuit.

It is another object of the present invention to provide an improved autoranging method and apparatus which allows adjustment to input level changes for each cycle of an input IF signal, by gain ranging prior to providing the input signal to subsequent processing.

It is another object of the present invention to provide an improved calibration method and apparatus for a radio frequency receiver which obviates the need for a precision phase shifter or a Doppler frequency generator at the front end or RF input of the receiver, and obviates the need for a FFT or spectrum analysis to derive correction components.

It is another object of the present invention to provide an improved digital phase reference method and apparatus for a radio frequency measurement receiver, which allows introduction of a periodic increment of phase offset to cause the receiver to "phase walk" a predetermined angular increment over a given time cycle, so as to provide a novel measurement methodology.

These and other objects, features and advantages of the present invention may be more clearly understood and appreciated from a review of the following detailed description of the disclosed embodiment and by reference to the appended drawings and claims.

BRIEF DESCRIPTION OF THE DRAWING FIGURES

Figure 1:
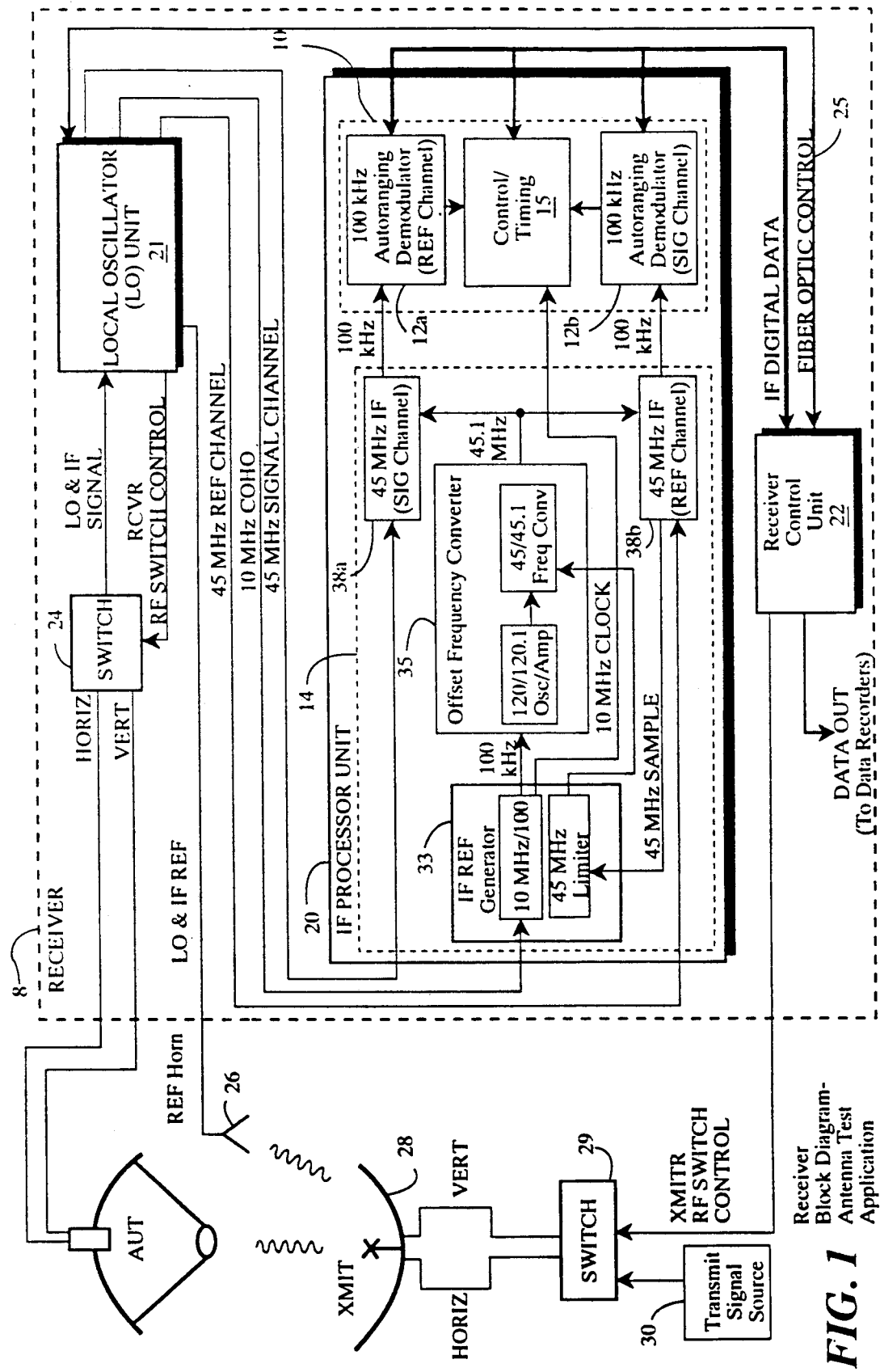
FIG. 1 is a block diagram of a radio frequency receiver which includes the preferred autoranging and demodulator embodiments and a control/timing circuit which includes the preferred digital phase reference embodiment constructed in accordance with the present invention, utilized in an antenna test system configuration.
Figure 3:
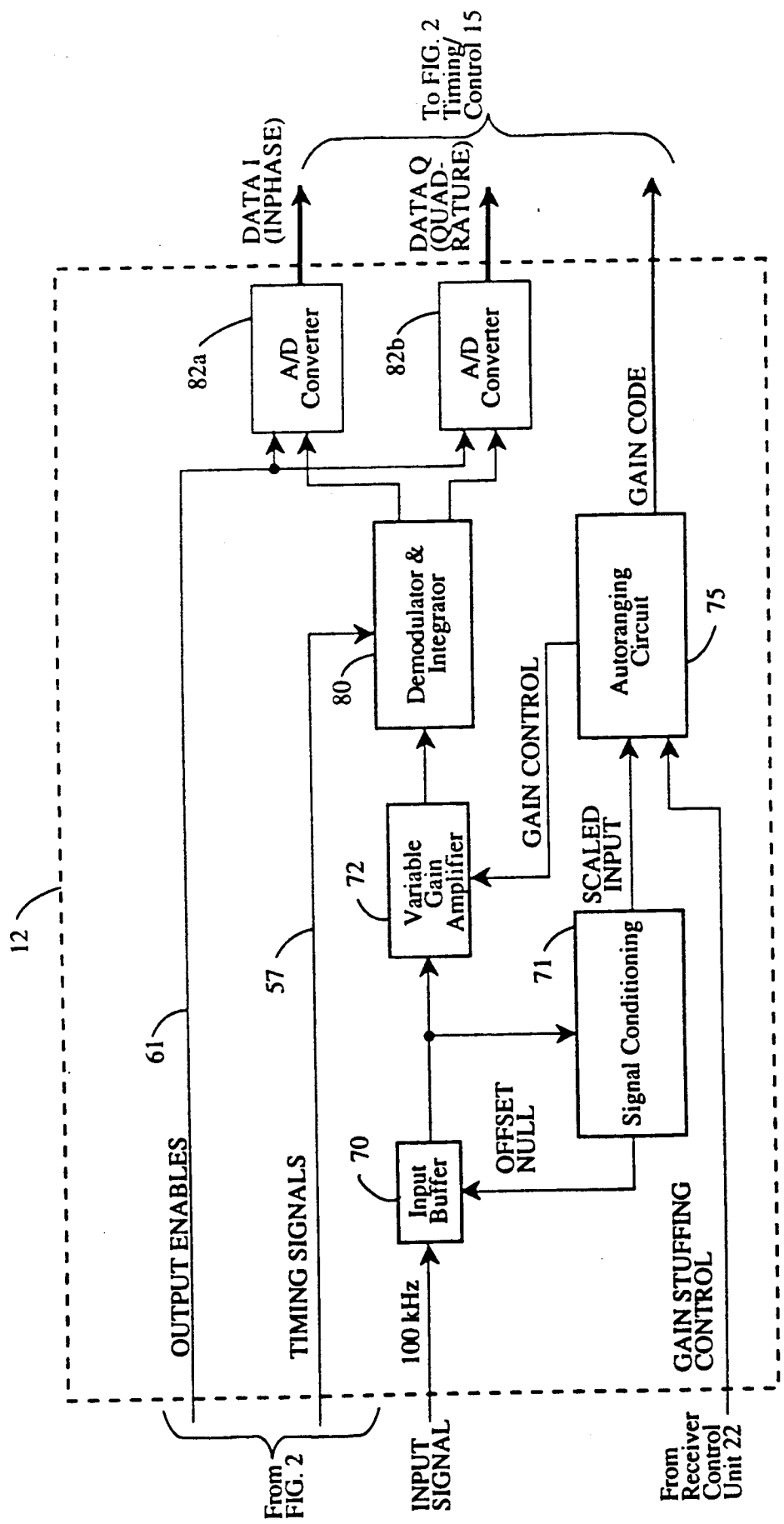
FIG. 3 is a block diagram of the preferred embodiment of a 100 kHz autoranging circuit and commutating demodulator constructed in accordance with the present invention, which is utilized in both the signal channel and the reference channel of the receiver system shown in FIG. 1.
Figure 4A:
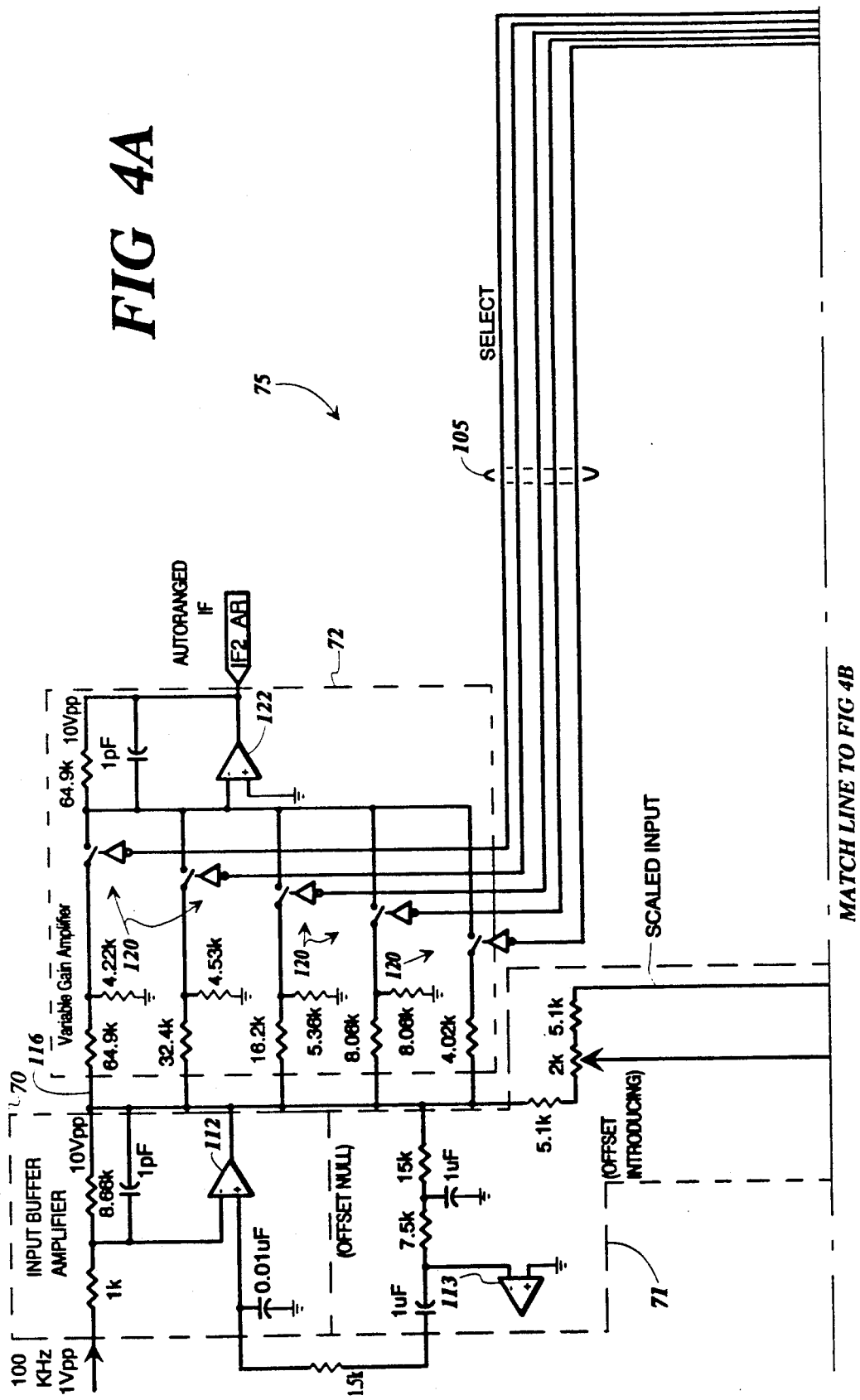
Figure 4B:
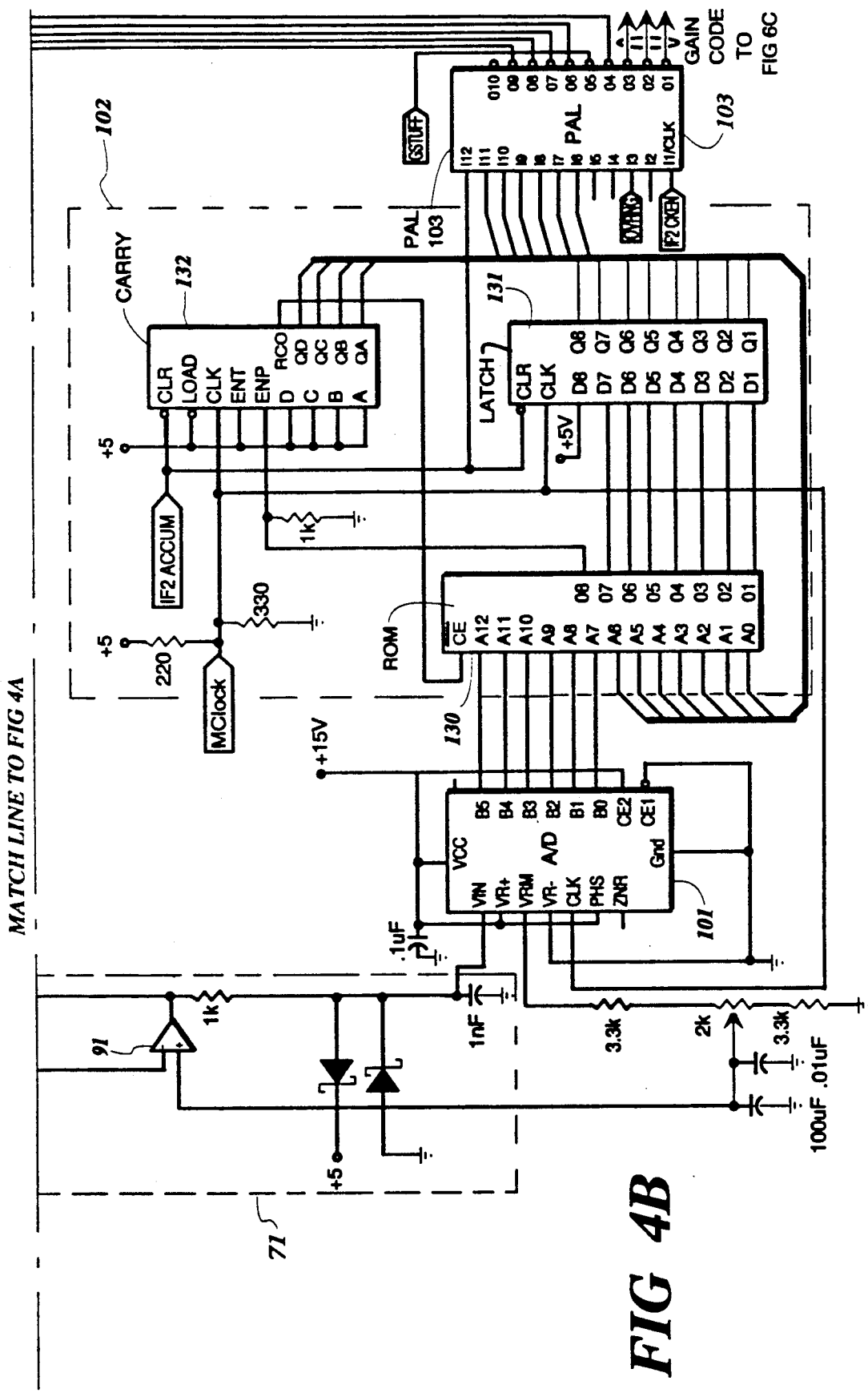

FIGS. 4 A and B is a detailed schematic diagram of the autoranging circuit employed in the preferred embodiment of FIG. 1 and shown generally in FIG. 3.

Figure 5:
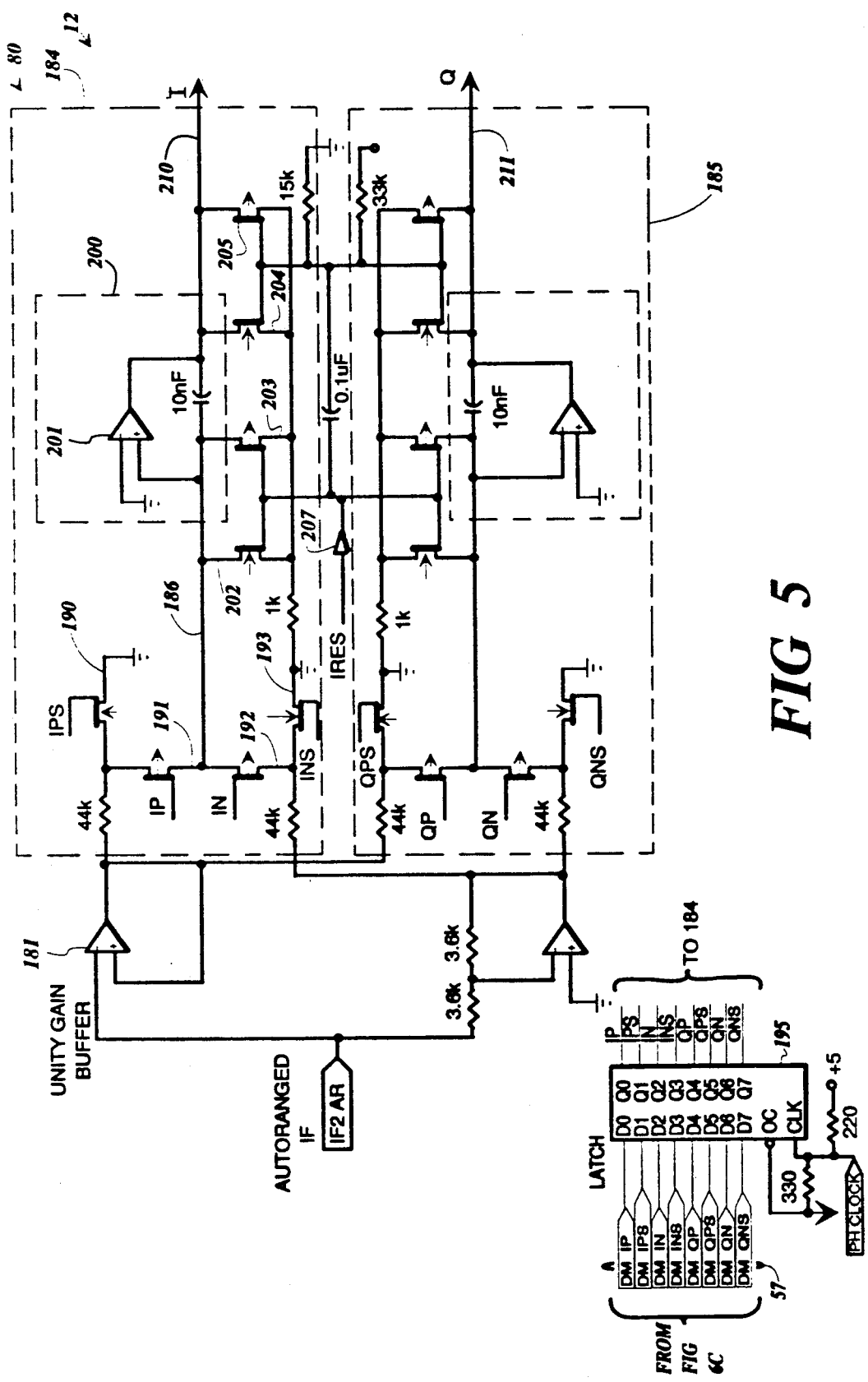

FIG. 5 is a detailed schematic diagram of the improved commutating demodulator employed in the preferred embodiment of FIG. 1 and shown generally in FIG. 3.

Figure 2:
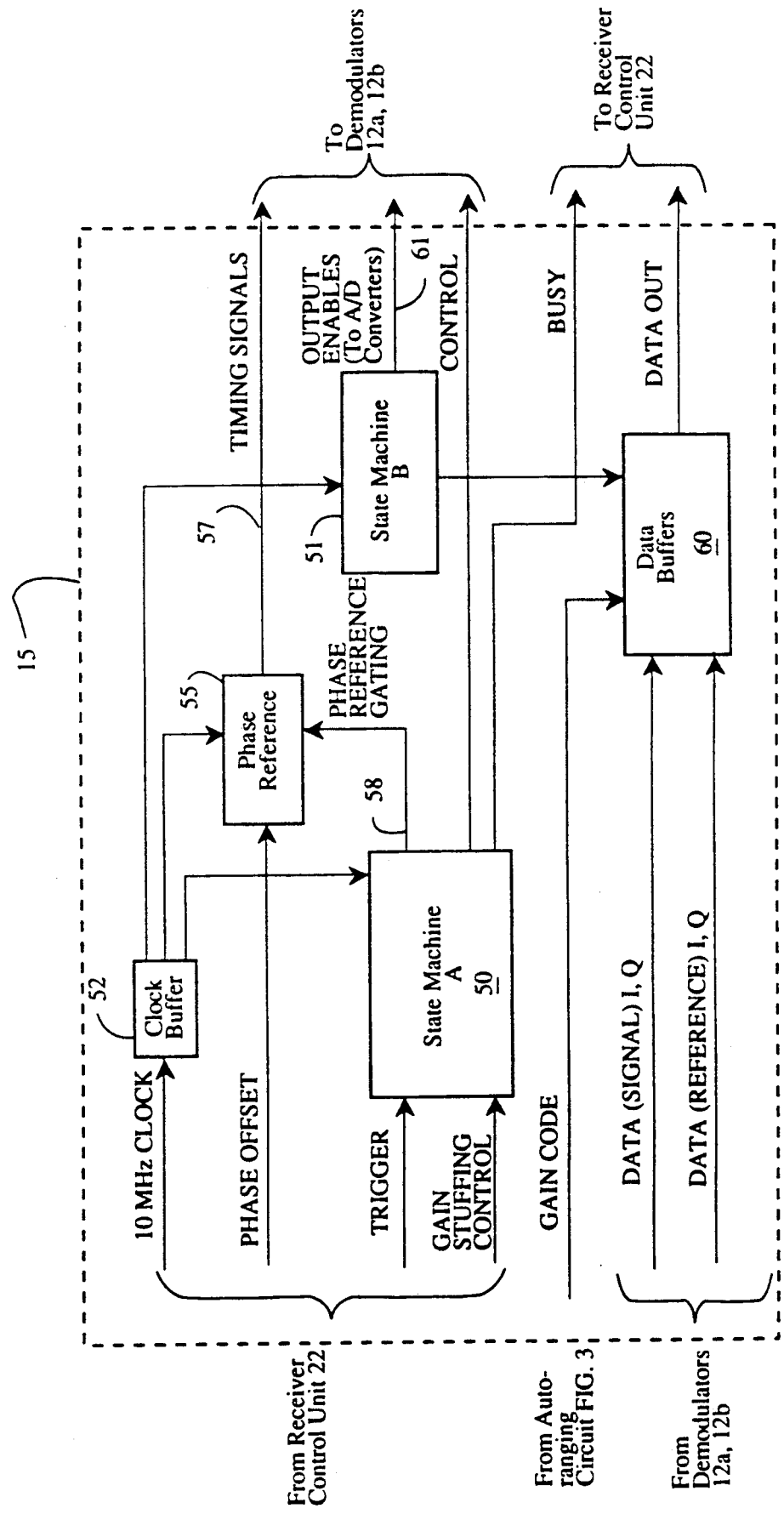
FIG. 2 is a block diagram of the preferred embodiment of a control/timing circuit constructed in accordance with the present invention, which is utilized in the receiver system shown in FIG. 1
Figure 6A:
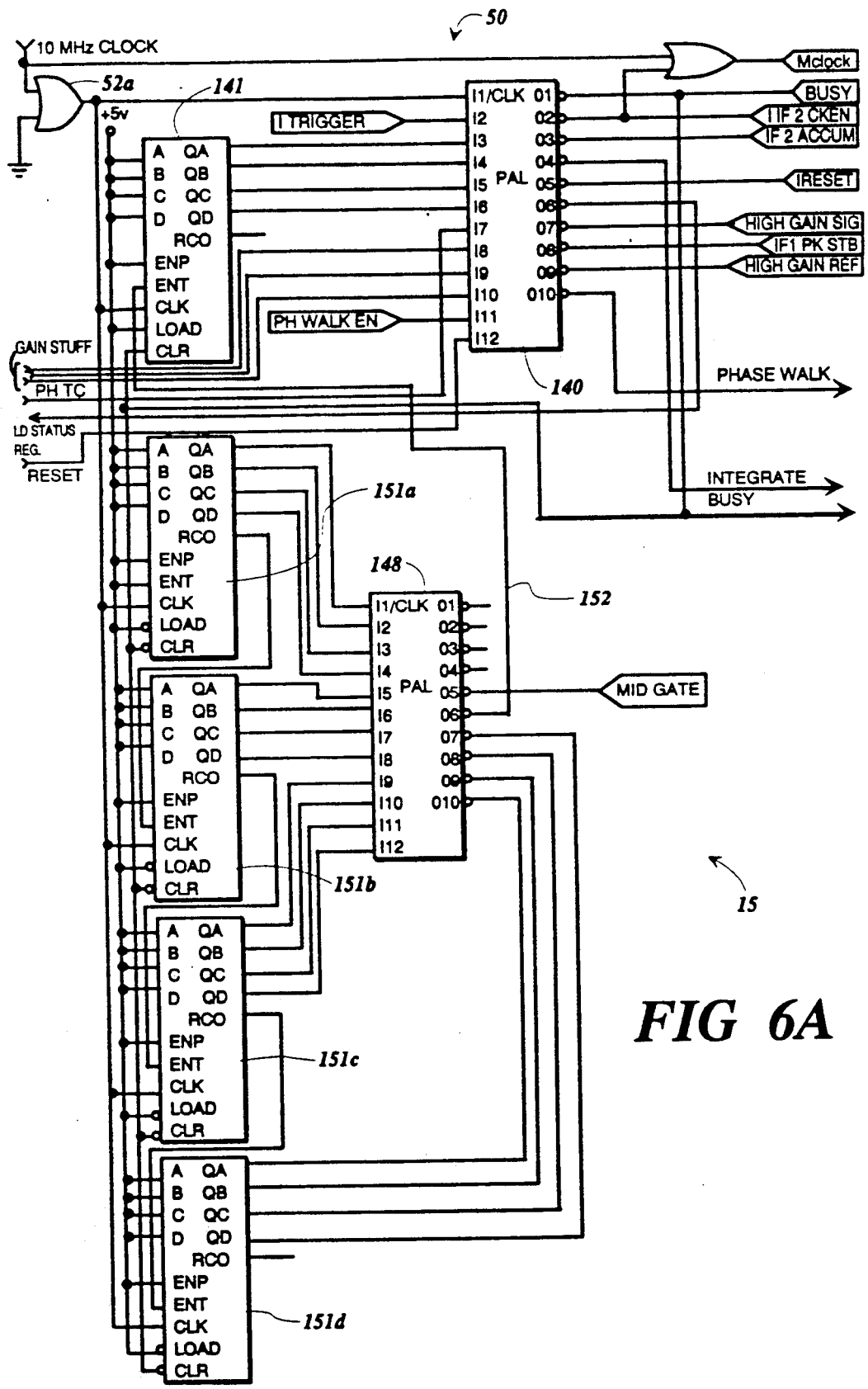
Figure 6B:
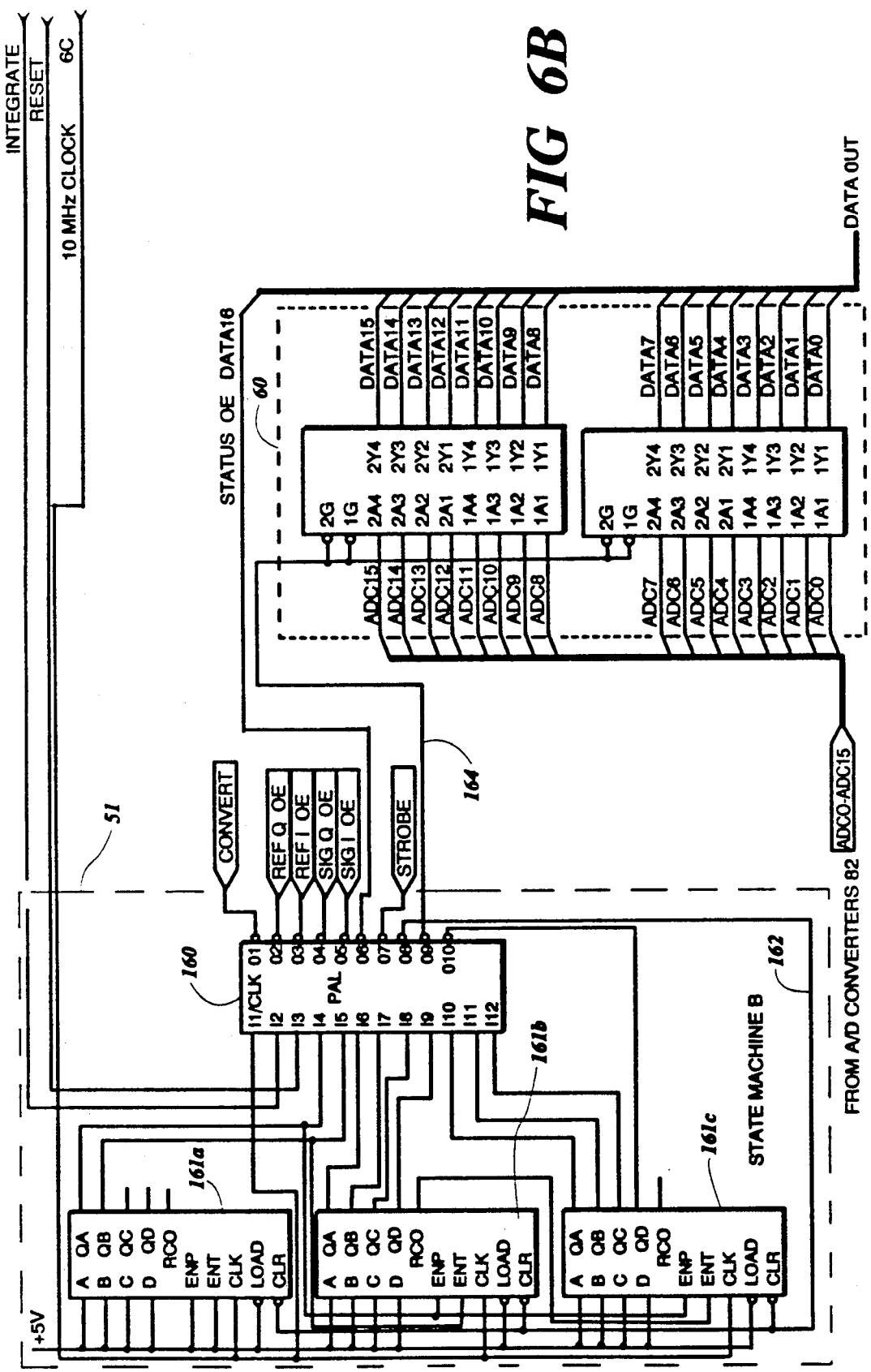

FIGS. 6A-6C, is a detailed schematic diagram of the control/timing circuit shown generally in FIG. 2.

FIG. 7 is a timing diagram illustrating the timing of a typical data acquisition cycle carried out by the preferred embodiment of the present invention.

FIG. 8 is a timing diagram illustrating the timing of a typical 10 μs interval during the integration period in the data acquisition cycle shown in FIG. 7.

DETAILED DESCRIPTION OF THE PREFERRED EMBODIMENT

Referring now to the drawings, in which like numerals indicate like elements throughout the several drawing figures, FIG. 1 shows a radio frequency (RF) high speed measurement receiver 8 which includes an improved second IF subsystem or circuit 10 constructed in accordance with the present invention, namely, an improved 100 kHz autroranging and demodulator circuits 12a, 12b, and a control/timing circuit 15, which includes the improved digital signal reference circuits and facilitates the disclosed calibration method to be described hereinbelow. The improved second IF subsystem 10 is included within an intermediate frequency (IF) processing unit 20, which includes a number of other components including a first IF subsystem 14 which do not form a part of the present invention. The complete receiver 8 further includes a local oscillator (LO) unit 21 and a receiver control unit 22 which are interconnected in the manner to be described.

By way of background, the receiver 8 is shown in FIG. 1 connected to an antenna under test (AUT), which is typically mounted in an antenna testing range for performance testing. The receiver 8 comprises a high speed, high accuracy, coherent A/D conversion system for RF signals such as microwave signals. Coherent detection results from providing completely separate signal and reference channels that are phase-locked together. An LO unit 21 provides a local oscillator signal that ranges from 1.9 to 4.6 GHz in the preferred embodiment, and provides a resulting first IF frequency of 45 MHz. The 45 MHz IF signals are amplified and buffered in the LO unit 21 and transmitted to an IF processor 20, where they are further amplified and downconverted to a second IF frequency of 100 KHz. Then, the 100 kHz IF signals are autoranged, synchronously detected using an internal high stability time base as will hereinafter be described, transformed into quadrature signals I and Q, and converted to digital format for utilization by a receiver control unit 22. Digital data corresponding to the phasor values of the signal and reference channels are generated by a control/timing circuit 15 in the IF processor 20 and sent as the signal IF DIGITAL DATA to the receiver control unit 22.

In FIG. 1, horizontal and vertical polarization antenna elements in the AUT provide a horizontally polarized input signal HORIZ and a vertically polarized input signal VERT to an RF switch 24, which switches between the two polarized signals under control of a signal RCVR RF SWITCH CONTROL provided by the LO unit 21. The incoming signal from the switch 24 comprises a LO & IF SIGNAL provided to the LO unit 21. The LO unit 21 in the preferred embodiment may be remotely located so as to preserve the sensitivity and dynamic range features desired in antenna range installations. Typically, a user of the system may elect to place the LO unit 21 as close to the AUT as is practicable. The LO unit 21 is controlled by a fiber optic control line 25 between a receiver control unit 22, allowing separation up to 2000 feet between the LO unit and other parts of the receiver.

Also connected to the LO unit 21 is a reference antenna horn 26, which is typically positioned at a stationary location in the antenna range and which receives a constant reference signal from a transmitter antenna 28. The signal from the reference antenna 26 is denominated LO & IF REF which is provided to the LO unit 21.

The transmit antenna 28 provides selectable horizontally and vertically polarized transmitted signals, denominated HORIZ and VERT, which are provided from an RF switch 29. The receiver control unit 22 provides a signal XMITR RF SWITCH CONTROL which switches between horizontal and vertical polarizations to the transmitting element in the antenna 28, from a transmit signal source 30, typically an RF transmitter amplifier.

The primary function of the IF processor unit 20 is to provide two stages of intermediate frequency processing for the receiver, so as to obtain a 100 kHz reference signal channel REF from the reference horn 26 and a 100 kHz signal channel SIG from the AUT. The LO unit 21 provides outputs comprising a 45 MHz REF CHANNEL, a 45 MHz SIGNAL CHANNEL, and a coherent oscillator signal 10 MHz COHO to the IF processor unit. Details of the LO unit 21 are not considered part of the present invention, and will not be discussed further herein, except to say that the preferred LO unit 21 need not include means for generating a phase-variable or frequency-variable calibration signal, because of the present inventions. However, it will be understood that the LO unit 21 provides a constant frequency calibration signal on both the 45 MHz REF CHANNEL and the 45 MHz SIGNAL CHANNEL in response to a calibration command provided from the receiver control unit 22 via the fiber optic control line 25.

The IF processor unit 20 further comprises other elements comprising a first IF subsystem 14, not part of the present invention, including an intermediate frequency reference generator 33, which divides down the coherent clock signal 10 MHz COHO provided from the LO unit and provides a precision stable time base 10 MHz CLOCK signal to the control/timing circuit 15.

The IF reference signal generator 33 provides a highly stable 100 kHz signal to an offset frequency converter 35, which generates a 45.1 MHz signal that is provided to 45 MHz IF downconverters 38a, 38b, for the signal and reference channels, respectively, whose outputs are the 100 kHz signals for the reference and signal channels.

Details of the operation of the offset frequency converter 35 will not be described further herein, inasmuch as the same is described in copending application Ser. No. 491,161, filed Mar. 9, 1990, entitled "Offset Frequency Converter for Phase/Amplitude Data Measurement Receivers" and owned by the same assignee as the present invention, which is incorporated herein by reference and made a part hereof as if the same were set forth fully herein. However, it should be understood that the offset frequency converter is operative to provide a 45.1 MHz signal to both downconverters 38a and 38b, which is phase locked to the 45 MHz REF CHANNEL, with a highly accurate 100 kHz frequency offset added thereto, so that a highly accurate 100 kHz signal will be provided by both downconverters 38 to the circuitry 10 of the present invention.

It should be further understood that the differences between the 100 kHz signals from the downconverters 38a and 38b are thus dynamically limited (i.e., within acceptable error tolerances) to the differences in phase and amplitude between the reference signal and the signal from the AUT, which reflect the measured parameters of the AUT. This dynamic limitation, which results from the operation of the referenced copending application, allows the present invention to operate successfully, inasmuch as the 10 MHz CLOCK signal and the 100 kHz signals from the downconverters 38 are phase locked. It will thus be understood that the precision of the 100 kHz signal frequency is of importance to operation of the present invention, and contributes to the high levels of accuracy obtainable.

After the signal and reference channels are converted to the 100 kHz second intermediate frequency, they enter the second IF subsystem 10 for autoranging, demodulation (that is, conversion to baseband), integration, and analog-to-digital conversion. It will be appreciated that the the present invention relates primarily to the second IF subsystem 10, which comprises the control/timing module 15 and the 100 kHz signal channel and reference channel autoranging demodulators and A/D converters 12a and 12b, which derived amplitude and phase data in the form of I and Q digital output signals, provided as IF DIGITAL DATA.

The digital results are then transferred out of the IF processor unit 20 to the receiver control unit 22 for further processing, display and output. The receiver control unit 22 provides as outputs 5000 samples per second for the signal and reference channel. Amplitude and phase or I and Q outputs are provided in digital form as DATA OUT in a variety of floating point numerical formats for further calculations and display. The receiver control unit 22 also provides controller interfaces such as an IEEE-488 bus, RS232/449 serial interfaces, a BCD recorder, and the like. The control unit utilizes high speed digital signal and floating point processors to receive the raw data signals and apply calibration corrections, numerical conversions, coherent averaging, and normalizations in real time. The resulting formatted data is available to a user directly from the control unit 22 via a fast parallel interface and is also distributed inside the control unit for display and output via the 488 bus, serial, and BCD recorder interfaces. Inasmuch as the details of the preferred receiver control unit do not form part of the present invention, the same will not be discussed further herein.

Turning next to FIG. 2, the preferred control/timing module 15 comprises a plurality of digital state machines, state machine A 50 and state machine B 51, which provide timing and sequencing signals. These timing and sequencing signals control analog processing, analog-to-digital conversion, and transfer of the results to the receiver control unit 22.

The 10 MHz CLOCK signal provided from the IF reference generator 33 is provided to through a clock buffer 52 to the state machine A 50, the state machine B 51, and a phase reference circuit 55.

The state machine A circuit 50 is the primary controller for the data acquisition process. Upon arrival of a TRIGGER signal from the receiver control unit 22, state machine A flags that it is busy with a BUSY signal, which is a status signal back to the receiver control unit 22. State machine A then sequences the 100 kHz demodulator circuits 12a, 12b through a single data acquisition cycle. A typical data acquisition (or measurement) cycle is shown and described more particularly in connection with FIG. 7. In general, however, state machine A provides phase reference gating signals on lines 58 to a phase reference circuit 55 and control signals on lines 59 to the demodulators 12.

The phase reference circuit 55 divides the 10 MHz reference clock by 100 to generate TIMING SIGNALS on lines 57 for controlling FET switches in the demodulators 12, and receives and stores a PHASE OFFSET signal from the receiver control unit 22. The phase reference circuit further includes means responsive to the PHASE OFFSET signal for effectively shifting the phase of the timing signals on lines 57 during a calibration operation. As will be discussed fully below, the phase offset is transformed by using a read only memory (ROM), which allows the introduction of an arbitrary phase shift for calibration purposes.

Still referring to FIG. 2, state machine B 51 controls the transmission of digitized signals from A/D converters in the signal and reference channels to the control unit 22 by sequentially enabling the data onto the output buses DATA OUT and generating accompanying strobes. State machine B is constructed separately from state machine A so that another data acquisition cycle can begin during transmission if required.

State machine B 51 provides enable signals designated OUTPUT ENABLES on lines 61 to A/D converters (see FIG. 3), and also controls data buffers 60. The data buffers 60 receive the digitized signals denominated DATA (SIGNAL) I, Q and DATA (REFERENCE) I, Q from the A/D converters, and a GAIN CODE signal from the autoranging circuit 75 (see FIG. 3). The outputs of the data buffer 60 are the output signals DATA OUT, which are provided to the receiver control unit 22.

A GAIN STUFFING CONTROL signal is also provided to the state machine A 50 and to the autoranging circuit 75 (FIG. 3). This signal, which originates in the receiver control unit 22 to control the autoranging gain stages during calibration, controls the provision of a gain code indicative of the current gain setting of a selectively variable gain amplifier in the autoranging circuit.

Turning now to FIG. 3, each of the 100 kHz demodulators 12a, 12b is of similar construction, as is shown in FIG. 3. The demodulator circuit 12 comprises an input buffer 70 which boosts the input 100 kHz signal to a suitable drive level for subsequent circuit stages. The output of the input buffer 70 feeds a variable gain amplifier circuit 72 and signal conditioning circuit 71. The signal conditioning circuit 71 nulls the offset of the input buffer 70 with a signal OFFSET NULL, and also provides a scaled and shifted version of the input signal denominated SCALED INPUT to an autoranging circuit 75.

The autoranging circuit 75 samples the SCALED INPUT signal and selects a gain in the variable gain amplifier 72 with a GAIN CONTROL signal to compensate for low level inputs and provide for operation over a wide dynamic range. It does this in 6 dB increments up to a maximum gain of 24 dB. The gain-adjusted output of the variable gain amplifier 72 is then provided to a demodulator and integrator circuit 80, where it is coherently demodulated in response to the TIMING SIGNALS on lines 57 into inphase (I) and quadrature (Q) components which are integrated for the remainder of a measurement cycle.

As a measurement cycle ends, 16-bit analog-to-digital (A/D) converters 82a, 82b, for the I and Q signals, respectively, capture the outputs of the integrators and begin a conversion cycle. When the conversion is complete, the OUTPUT ENABLES signal on line 61 from the control/timing module 15 (FIG. 2) gates the results onto a common buss for provision to the data buffers 60.

Turning next to FIG. 4, next will be described the details of the autoranging circuit 75 for measuring the signal level and providing selectably variable gain. The preferred autoranging circuit 75 comprises a detector of sufficient accuracy for digital implementation of autoranging, and is based upon a flash A/D converter 101, input buffer amplifier 70, and variable gain amplifier 72.

Prior to reaching the flash A/D circuit 101, the input signal at 100 kHz is buffered by amplifier 70. The preferred input buffer amplifier 70 comprises a type 5147 operational amplifier 112, configured via feedback network comprising resistor R14 and capacitor C13 with a gain of 10 for amplification, with an output on line 116 comprising the buffered output. The noninverting input of the amplifier 112 is connected to the output of an offset-nulling operational amplifier 113. Op amp 113 is configured to receive the signal on line 116 from the amplifier 112 via a low pass filter network comprising 1 $\mu$F capacitor C15 and 15K resistor R8, so that any DC drift on line 116 is detected and nulled by adjusting the reference level at the noninverting input of op amp 112.

The variable gain amplifier 72 comprises a plurality of staggered value precision resistors R15–R19 in series and R10–R13 to ground, which are switched to a common node 119 by five analog switches 120, all of type CDG309 manufactured by Siliconix, Inc., of Santa Clara, Calif. The outputs of all analog switches 120 are commonly connected at node 119 to the inverting input of an operational amplifier 112, whose output is fed back through a precision resistor R20 to the inverting input node, and whose noninverting input is referenced ground. The combination of feedback resistor R20 and selectable input resistor networks R15–R19 in series and R10–R13 provide five selectable gains: nominally 0 dB, 6 dB, 12 dB, 18 dB or 24 dB. The output of the op amp 122 swings 10 $V_{pp}$ and comprises the intermediate frequency 100 kHz autoranged signal denominated AUTORANGED IF, which is provided to the demodulators 12.

The flash A/D converter 101, preferably a type CA3306CE six bit converter manufactured by RCA Corporation of Somerville, N.J., provides digital samples of the SCALED INPUT signal, which has been offset via an offset introducing part of the signal conditioning circuit 71 to center the voltage swing. The A/D converter 101 is enabled for constant operation.

The offset introducing part of circuit 71 comprises an operational amplifier 91, preferably a type 5127 or equivalent, configured to receive the input signal at its inverting input from the buffer amplifier 70, with feedback from the output, and to receive a mid-range output reference signal from the RM terminal of the flash A/D converter at its non-inverting input. Five volt zener diodes D9, D10 provide protection at the input VIN of the A/D 101, which is connected to the op amp 91 output. The op amp 91 therefore references the input signal to the midpoint of the operational range of the A/D flash converter.

An adder/accumulator circuit 102 accumulates the absolute value of digital samples provided by the A/D converter 101. Accumulation is preferably performed for a full cycle of the signal being autoranged, resulting in decreased sensitivity to DC offsets. A comparator implemented in the form of programmed logic array (PAL) 103 makes a final autoranging decision based on the accumulated value, and provides an output signal GAIN CODE (a three-bit code) to the other circuits for utilization as a part of the data stream, and provides five SELECT lines 105 to the variable gain amplifier 72.

The preferred adder/accumulator 102 includes a read only memory (ROM) 130, which is preferably a type CY7C263 manufactured by Cypress Semiconductor of San Jose, Calif., having thirteen address lines and eight output lines. The ROM is programmed with all possible mathematical combinations of a six-bit "sample" value (from the A/D 101) and a seven-bit "accumulated" value (from a register or latch 131) which represents the results of digital integration over a number of cycles, say, fifty. Thus, six of the address lines to the ROM 130 are provided from the A/D 101, while seven of the input lines are provided from the outputs of an eight-bit latch 131, which serves as the "accumulator" register. Thus, the output of the ROM 130 at any given time is the sum of the previous output (fed back from the latch 131), and the absolute value of the new output from the A/D converter 101. For each flash conversion, the absolute value of the signal is added to the accumulated amount. Any carry bits, which are represented by the highest order bit of the ROM 130, are counted by a carry bit counter 132, which is clocked by a master 10 MHz clock signal MClock. A control signal IF2 ACCUM provided from the state machine A 50 (FIG. 6A) clears the accumulated value in the carry counter 132 and latch 131, and is synchronized to a measurement cycle.

After a predetermined number of samples is accumulated, preferably at least fifty in the preferred embodiment given the clock rate of 10 MHz and the IF frequency of 100 kHz, the PAL 103 enacts an autoranging decision based on the number provided to it from the counter 132 and latch 131. It should be understood, however, that the accumulation interval is preferably chosen to be a full cycle of the signal frequency, namely 100 kHz, which permits 100 cycles of accumulation of the SCALED INPUT signal. Only the higher order of significance bits AC5–AC10 from the latch 131 and counter 132 are provided as address inputs to the PAL 103. PAL 103 is preferably a type 22V10 manufactured by Cypress Semiconductor of San Jose, Calif., which is programmed to provide a three-bit GAIN CODE output indicative of the selected value (or alternatively receive a three bit GAIN CODE input under certain conditions, described below) and five bits of SELECT lines 105 to select one of the selectable gain stages of the amplifier 72. A "gain stuff" signal GSTUFF is provided as an input to the PAL 103, and determines whether the autoranging result sets the gain or whether the gain is "stuffed" by the receiver control unit 22 (during calibration).

It should be understood that when the GSTUFF signal is true, a three bit value for GAIN CODE will be present on the bidirectional data lines connected to the GAIN CODE lines, from the receiver control unit 22. This causes the PAL 103 to select a particular one of the select lines 105 to set the gain, thereby allowing external gain stage setting for calibration.

Those skilled in the art will understand that the integration or accumulation of the input signal for a full cycle for autoranging decision purposes will not vary with signal phase or as the starting time for the accumulation changes, which thereby removes some difficult timing constraints from the system. It will be further understood that while a shorter integration interval, say on the order of 5 microseconds (a half-cycle integration) will also be operative, it has been determined that a full-cycle integration is less sensitive to offsets and is preferred.

It should also be understood that the preferred autoranging circuit 75 does not utilize the known prior art approach wherein range information from one measurement cycle is used to set the input sensitivity or gain ranging for the next cycle. Rather, the limitations on latency imposed by the prior art approach are not present, so that higher speeds of operation are possible even if the input level changes abruptly between measurement cycles. Thus, the signal AUTORANGED IF is gain-ranged, indicated by the GAIN CODE, and ready for processing at the appropriate time.

It will now be appreciated that the use of the flash A/D converter 101 and digital accumulator 102 provide speed and precision with minimal need for circuit adjustments, while also providing rapid response time with good noise rejection. It will be further appreciated that the above-described approach separates the autorange measurement process from the main measurement or digitization process. While the use of range selection circuitry separate from main signal paths is known in the art, it is believed that the use of the flash A/D converter 101 to convert the input signal into a stream of digital samples and to utilize such samples after accumulation and integration, provides novel advantages not heretofore known. Primarily, it will be appreciated that the autoranging method is carried out before the subject signal is "detected", that is, the data is converted into digital form.

Turning next to FIG. 6, consisting of FIGS. 6A–6C, the control/timing circuit 15 controls many of the operations of the demodulator and data conversion processes. Turning first to FIG. 6A, the preferred control/timing circuit 15 and its state machine A 50 is constructed around a programmed logic array (or PAL) 140 which receives various commands, status, and state inputs and provides control outputs. The principal input is the TRIGGER signal from the receiver control unit 22, which is provided to one of the PAL 140 inputs. The TRIGGER signal starts a conversion cycle.

Other PAL inputs include four output lines QA-QD from a counter 141, which is clocked by the 10 MHz CLOCK buffered by the clock buffer 52a. Counter 141 provides various delay states of varying lengths. A terminal count (TC) signal denominated PH TC from a divide-by-100 counter 142 (FIG. 6C) signals the end of each cycle of the 100 kHz signal. The counters 141, 142, 151, 161 are all preferably type 74ALS161 manufactured by Texas Instruments or equivalent.

A RESET signal provides another input to the PAL 140, and constitutes a master reset signal generated on system powerup. Signals denominated GAIN STUFF are provided to the PAL from a gain code stuffing circuit 145 (FIG. 6C), which is operative to insert the three-bit GAIN CODE determined by the receiver control unit 22 during calibration. The GAIN STUFF signals comprise clock-synchronized versions of the status signals GSTUFF, REF STF INV, and GAIN1. During normal operation, the gain code originates in the autoranging circuit 75 and passes to the receiver control unit 22 via status latch 163. During calibration, however, the receiver control unit 22 must force various gain conditions. It does so by means of control latch 172 which samples the control signals at the beginning of a 200 µs acquisition cycle, and buffer 173 which is turned on during the stuffing process to drive the gain code lines as commanded by the receiver control unit 22. The GAIN1 signal relates to a gain control circuit (not shown) in parts of the IF processor unit 20 prior to the circuitry 10 of the present invention.

A final input to the PAL 140 in FIG. 6A is the signal PH WALK EN, which signifies "phase walk enable". This signal is asserted by the receiver control unit 22 to signify that phase walking is desired. Phase walking enables a pulse swallowing gate 146 (FIG. 6C) via the signal PHASE WALK, which blocks a single 100 nanosecond pulse of the 10 MHz clock. The absence of a single pulse from the clocking of the divide-by-100 counter 142 generates an effective 3.6° phase offset or shift in the operation of the demodulator circuit 80 (FIG. 5) in the autoranging demodulator 12, by postponing the generation of the FET timing signals for one clock cycle.

Still referring to FIG. 6A, control outputs of the PAL 140 include the BUSY signal, which is provided to the receiver control unit 22 to indicate that a data acquisition cycle is in process. An IRESET signal causes reset of the integrator circuits in the demodulator 80. A IF2 CKEN signal enables the clock at PAL 103 (FIG. 4). An IF2 ACCUM signal clears the accumulator 102. These signals together control the autoranging process by switching the clock to the accumulator 102 and commanding the PAL 103 to apply the result to the gain switches 120 (FIG. 4).

The state machine A 50 in FIG. 6A further comprises a second PAL 148, whose inputs are connected to four cascaded counters 151a–151d, all type 74ALS161, which are clocked by the 10 MHz clock signal through clock buffer 52a. The counters 151 are cleared when the BUSY signal goes low (indicating not busy), and serve as a time keeper during the 1800 clock cycles which comprise a conversion cycle. At appropriate times during the conversion cycle, PAL 148 provides a count enable signal on line 152 to counter 141, advancing the state machine A to its next state. These states are listed as a part of FIG. 7. PAL 148 also provides a MID GATE output signal to flag the midpoint of the signal integration process. This signal goes through the receiver control unit 22 and is available to the user.

A principal output signal from the PAL 140 is the INTEGRATE signal, which is true during the portion of the conversion cycle and demodulation cycle for integration by the demodulator 80. The INTEGRATE signal controls the demodulator control signal memory 171 for demodulation (and integration) or hold (during A/D conversion of the result). Signals denominated HIGH GAIN SIG, HIGH GAIN REF, and IF1 PK STB from PAL 140 control a switchable gain stage located in the (45 MHz) first IF subsystem 14 of the receiver (FIG. 1), which does not form a part of the present invention.

The PHASE WALK signal from PAL 140 is provided to the pulse swallowing gate 146, to cause blockage of a single clock cycle at the divide-by-100 counter 142 (FIG. 6C).

A LD STATUS REG signal from PAL 140 is provided to a status register 163, to strobe data into the register.

In FIG. 6B, it will be seen that the state machine B 51 is constructed around a PAL 160, again a type 22V10. The inputs to the PAL 160 include the RESET SIGNAL, the INTEGRATE SIGNAL, and timing signals generated by three cascaded counters 161a-161c, which are clocked by the 10 MHz CLOCK and cleared on the count of 400 with a signal on line 162 from one of the output pins of the PAL 160.

As discussed above, the state machine B 51 controls the gating of the data buffer 60, which comprises a pair of type 74LS244 tristate eight-bit buffers manufactured by Texas Instruments. These buffers 60 have their inputs connected to the outputs of the analog-to-digital converters 82a, 82b (discussed in connection with FIG. 3) on lines ADC0-ADC15, and provide 16 bits of output on lines DATA0-DATA15 to the receiver control unit 22. A signal on line 164 from the PAL 160 enables the buffers 160 to place their signals onto a data bus DATA OUT, comprising signals DATA0-DATA15. A STROBE signal is provided from the PAL 160 to the receiver control unit 22 to indicate that the data on the DATA OUT lines should be strobed in.

Four output lines of the PAL 160 provide output enable signals for the I and Q of the reference channel and the I and Q of the signal channel, denominated REF Q OE, REF I OE, SIG Q OE, and SIG I OE. These signals sequentially enable the outputs of the A/D converters to be provided to the inputs of the buffer 60.

A final output from the PAL 160 is the line STATUS OE, which enables the output of the status register 163 to the data line DATA OUT, shown in FIG. 6C. The status register 163 is a type 74LS374, which stores various status information including the three-bit GAIN CODE in the signal channel and the three-bit GAIN CODE in the reference channel, denominated SIG0-SIG2 and REF0-REF2, respectively.

In FIG. 6C, the control/timing circuit 15 further comprises a phase offset latch 170, preferably a type 74LS374 manufactured by Texas Instruments. This latch is clocked by the BUSY signal, which clocks in a 5-bit phase offset number on lines PHASE 0-PHASE 4, which signify a desired phase offset provided for the calibration from the receiver control unit 22. The outputs of the phase offset latch 170 are connected to a timing signal ROM 171, which comprises the timing signal generator for the demodulator and integrator circuit 80, part of the 100 kHz demodulator circuit 12, described in more detail in connection with FIG. 5. The preferred ROM 171 is a type CY7C263 manufactured by Cypress Semiconductor, and is 8K by 8. As discussed, five bits of input are provided from the phase offset latch 170, seven bits are provided from the divide-by-100 counter 142, which counts cycles of the 10 MHz clock to subdivide each 10 µs cycle of the 100 kHz IF into 100 intervals of 100 nanoseconds (ns) each. The remaining bit is the INTEGRATE signal, which controls the ROM for demodulation or hold.

The output signals from the ROM 171 comprise timing signals on lines 57 for switching the FETs in the demodulator 80 in FIG. 5, denominated QNS, QN, QPS, QP, INS, IN, IPS, and IP, where Q signifies the quadrature channel, I signifies the inphase channel, P signifies during the positive portion of the input signal, N signifies during the negative portion of the input signal, and S signifies shunt, as will be discussed more fully below.

A gain code stuffing circuit 145 comprises a type 74LS374 latch 172, which is clocked by the BUSY signal which clocks in the three-bit GAIN CODE from the receiver control unit 22, denominated GAIN 0--GAIN 2, and plus control signals REF STF INV, GSTUFF, and GAIN1, which comprise the GAIN STUFF signals. These signals allow the receiver control unit 22 to dictate the gain during calibration.

The outputs of the latch 172 are provided as the GAIN STUFF signals which signify the gain code being provided for the reference channel or the signal channel, and the I and Q portions thereof (again depending on timing), and are also provided to a tri-state buffer 173, a type 74LS244. During calibration, the outputs of the buffer 173 are enabled onto gain code lines denominated REF0-REF2 and SIG0-SIG2. These signals go to the reference and signal channel demodulators 12a and 12b respectively, where they are connected to the GAIN CODE pins of PAL 103 (see FIG. 4). During normal operation, buffer 173 is disabled and PAL 103 provides the GAIN CODE signal for transmission to the receiver control unit 22.

Turning now to FIG. 5, the demodulator and integrator circuit 80 of the 100 kHz demodulator 12 comprises an improvied commutating demodulator which generates I and Q output signals from the input signal AUTORANGED IF from the autoranging circuit 75 (FIG. 4), both phase-referenced to the 10 MHz clock as divided down by phase reference counter 142. The AUTORANGED IF signal is provided first to a unity gain buffer comprising operational amplifier 181, again a type 5127. In addition, AUTORANGED IF is provided to a unity gain inverter comprising operational amplifier 182 connected in an inverting configuration. The op amp 182 provides a positive signal during negative excursions of the input signal, and a negative signal during positive excursions of the input signal.

The demodulator 80 comprises I channel 184 and Q channel 185, which are of similar construction except they are clocked 90° apart by their respective timing signals. Referring particularly to the I channel 184, the circuit includes a node 186 which is always held at virtual ground by an integrator 200. The demodulator operates by switching current proportional to the magnitude of the input signal into this node.

An L-topology switching network comprising a shunt field-effect transistor (FET) 190 and a signal passing FET 191 is connected to shunt the signal to ground or to the node 186, depending upon the timing signals.

A similar L-topology for the negative version of the signal comprises inverted signal passing FET 192 and negative shunt FET 193. While the signal passing FET 191 is switched on to pass current proportional to the input signal to the node 186, the shunt FET 190 is off, but the negative shunt FET 193 is switched on, holding the drain of FET 192 at ground. Likewise, when the inverted signal passing FET 191 is switched on, the negative shunt FET 193 is off, but the shunt FET 190 is on, again holding the drain of FET 191 at ground. Note that shunting by FETs 190 and 193 improves circuit accuracy by preventing forward voltage across the signal passing FETs 191 and 192 when these signal passing FETs are switched off.

It will thus be appreciated that current provided to the node 186 alternates between positive and negative versions of the input signal. The FETs 190, 191, 192, 193 are gated by the control signals IPS, IP, IN, and INS, respectively, which are provided from directly from the latch 195, which is a type 74AC11374, to the gates of the FETs. The inputs to the latch 195 are directly connected to the outputs of the timing signal ROM 171 (FIG. 6C). Thus, it will also be appreciated that the latch 195 directly drives the FET gates.

The latch 195 is clocked with a signal PH CLOCK, which is provided from the clock buffer 52b in FIG. 6C, so that the switching outputs to the gates of the FETs all occur precisely synchronized to the clock so as to provide extremely consistent switching times. The preferred FETs are type SD5000 DMOS FETs manufactured by Siliconix, which have an extremely fast switching time.

Node 186 is connected to the inverting input of a current integrator circuit 200, which comprises a 5127 operational amplifier 201 connected with a 10 nF capacitor fed back to the inverting input in a conventional integrating arrangement, with the noninverting input referenced to ground. The integrator circuit operates until reset, and it should be understood that integration is carried out for a plurality of cycles of the 100 kHz input signal, 15 in the preferred embodiment, thereby corresponding to 150 μs to obtain a single I and Q output value.

It will be further noted that resetting means for the integrator 200 comprises FETs 202, 203, 204, 205, all type SD5000. A pair of FET's 202, 203 are connected between the input of op amp 201 and a discharge node 206, and are gated by the resetting signal IRES through a buffer 207. Buffer 207 is preferably a type TSC 427 manufactured by Teledyne. A similar pair of FETs 204, 205 are connected between the output of op amp 201 and the discharge node 206, and are similarly switched on by the IRES signal. When the IRES signal is true, FETs 202, 203, 204, and 205 all turn on, effectively shorting the terminals of the integrating capacitor C29. The time constant for discharge of the integrator capacitor C29 is about 1 μs, so the discharge is rapid. Dual FETs 202, 203 and 204, 205 are provided for sufficient current-carrying capacity so that the integrated charge on the capacitor C29 can be quickly dumped.

The output of integrator 200 on node 210 is the inphase component signal I which is provided to the A/D converters 82a (FIG. 3). It will be appreciated that a similar construction for the Q channel 185 is provided, with the quadrature component signal Q provided on node 211 to A/D converter 82b.

FIG. 7 graphically illustrates the timing considerations for a typical data acquisition cycle CYCLE 1 carried out in the preferred embodiment. FIG. 7 is believed to be self-explanatory, with a few notes. First, inasmuch as an acquisition (or measurement) cycle is nominally 180 μs, and inasmuch as the measurement system provides 5000 samples per second output, it will be understood that the remaining 20 μs of each sample cycle is reserved by the receiver control unit 22 for overhead operations such as channel switching and frequency changes. Secondly, it should be noted that the events subsequent to 180 μs, namely, the output strobes of the SIG I, SIG Q, REF I, and REF Q signals, are handled by state machine B 51, so these events can continue into the next acquisition cycle, CYCLE 2. Thirdly, the events related to the IF1 signify the first IF stage or subsystem 14 (FIG. 1), and should not be confused with the second IF subsystem 10. Fourthly, the presence of either a phase walk command via the PHASE WALK signal, or of a phase offset via the PHASE OFFSET, will cause an effective shift of the timing of the demodulation and integration steps, by times corresponding to 100 ns for a phase walk of 3.6° and 2.5 μs per 90° of phase offset (90°/3.6°=25 clock ticks, 3.6° per 100 ns=2500 ns or 2.5 μs). Inasmuch as the input signal frequency of 100 kHz corresponds to an input signal cycle time of 10 μs, shifting the timing by 2.5 μs (for each 90°) of each "sample" of the input signal taken by the FETs in the demodulator circuit 80 therefore causes an effective 90° phase shift in sampling with respect to the 10 MHz phase reference clock.

FIG. 8 illustrates the relationship between the timing or control signals provided on lines 57 from the ROM 171, of a typical 10 μs interval during the integration of the integrator and demodulator circuit 80. It should be noted that at the 180 μs point on FIG. 7, IP=IN=QP=QN=0, and IPS=INS=QPS=QNS=1, and results in a signal "hold" mode.

CALIBRATION IMPLICATIONS

With the foregoing circuitry in mind, it will now be understood that the autoranged signal AUTORANGED IF provided to the demodulator 80 in FIG. 5 must be multiplied by a reference signal to produce a demodulated or baseband result in the form of I and Q, which are digitized, further processed, and displayed. The reference signal chosen for demodulation is a square wave, generated by the divide-by-100 counter 142 in conjunction with the control signal ROM 171 (FIG. 6C). Although a sine wave reference signal may be cleaner, the spurious results arising from the use of a square wave as a reference are high enough in frequency that they can be easily removed.

Since the preferred embodiment provides for detection of both the inphase I and quadrature Q components of the signal (both sine and cosine terms), two reference square waves are actually utilized, 90° out of phase with one another. These square waves are generated by the ROM 171 in FIG. 6C in principle, but there is not a signal output from the ROM which precisely corresponds to these two reference square waves. Stated in other words, the effects of quadrature reference signals are manifested in the timings of the timing signals on lines 57 for the modulator FETs.

The application of these FET timing signals to the calibration process will now be explained. Although there are nominally two reference square waves (which are not actually manifested outside the ROM 171), the ROM 171 provides eight output signals on lines 57. These signals comprise decoded versions of the two reference square wave signals, which permit the specification of an "off" state (where IP=IN=0) as well as a +1 state (IP=1, IN=0) and a −1 state (IP=0, IN=1).

It will be recalled that some of the inputs to the ROM address lines A0–A6 are from counter 142 and are thus indicative of time—these lines specify the time within a current 10 μs cycle of the 100 kHz IF input signal. The ROM 171 includes five additional input lines A7–A11 which are provided from the phase offset latch 170. This latch 170 is loadable from the receiver control unit 22. These signals serve as mode inputs to vary the way in which the reference signals are generated. In other words, the mode inputs allow selection from a predetermined set of variations in the reference signals, corresponding to one of a plurality of different phase offsets, particularly useful for calibration of the entire receiver 8.

Calibration of the receiver 8 entails measuring a calibration reference signal, which originates in the LO unit 21 and is controlled from the control unit 22, and measuring the effect which the various switchable gain stages of the variable gain amplifier 72 in the autoranging circuit 75 have on the reference signal. During calibration, the reference signal is imposed upon both the signal channel and the reference channel of the IF processor unit 20, since both channels must be calibrated.

The calibration signal is a full-scale reference signal and is arbitrarily assigned the receiver's "full scale" value of 0 dB, and corresponds to an input level of about −20 dBm. The phase of this signal is also measured. The inphase I and quadrature Q components for both the signal channel and the reference channel are then measured. The measured values are then applied to a matrix which is computed within the receiver control unit 22, and a correction matrix is obtained. When subsequent values for I and Q in either reference or signal channels are received, they are multiplied by the correction matrix with a microprocessor (not shown) in the receiver control unit 22 to obtain corrected values.

Two error types are corrected by the foregoing method: gain errors and orthogonality errors. Offset errors are also corrected by fixed values added to the inphase or quadrature output of a receiver channel. Gain and orthogonality errors are deviations of the inphase and quadrature reference signals from being exactly 90° out of phase with each other, or deviations of the phase shifts in the inphase and quadrature sides of the demodulator circuits 12a, 12b from each other.

It will be appreciated that the foregoing method for calibration of an RF receiver provides the advantage over such prior art systems as shown in the Churchill et al. U.S. Pat. No. 3,950,750 in that there is no need for a precision 90° phase shifter, no need for a Doppler frequency generator, and no need for performing a FFT to obtain correction values. For calibration of such receivers, it is required that some type of calibration reference signal be shifted by 90° to obtain an orthogonality error component. However, the present inventors have discovered that it is just as effective to shift the phase of the reference signal used in the demodulators 12, by controlling the timing of signals from the ROM 171. Because the ROM is clocked with the 10 MHz clock (100 ns per clock tick) to obtain the switching signals for the demodulator FETs, and because each cycle of the input signal is nominally 10 μs, it is possible to provide for a plurality of predetermined effective "phase shifts" of a "reference" signal merely by postponing generation of the FET switching or timing signals on lines 57 until a predetermined count in the divide-by-100 counter 142.

Thus, it will be appreciated that the phase offset signals stored in the phase offset latch 170 provide for a shift in the generation of the FET timing signals provided out of the ROM 171, for a delay time corresponding to a desired one of a plurality of predetermined phase shifts. Accordingly, during calibration, the ROM 171 is stepped through four predetermined phase offsets (although it will be understood that more or fewer could be provided): 0°, 90°, 180°, and 270°, and the results of the measurements of the signals in the I and Q for both the signal and the reference channel are combined in a matrix to correct for all known error terms.

With the foregoing in mind, the mathematics of the calibration will now be discussed. Three types of calibration corrections are effected in the preferred embodiment: offset, orthogonality, and gain. In order to correct for offset, N symmetrically placed phasors (for example, four) are generated. The phasors will cancel, leaving the channel offset times N. This channel offset is a phasor quantity which will be subtracted from the raw data before the gain and orthogonality correction matrix is applied. A microprocessor (not shown) in the receiver control unit 22 calculates a 2×2 matrix substantially as follows:

$$\begin{bmatrix} (I_{00}-I_{04}) & (I_{05}-I_{0F}) \\ (Q_{00}-Q_{04}) & (Q_{05}-Q_{0F}) \end{bmatrix}$$

The subscripts represent the four phase offset codes of 0°, 90°, 180°, and 270°, respectively, in hex code. Each of the terms above is the sum of $2^k$ measurements, where $k=1$ to $11$. The summing is best done at the outset to minimize further calculations.

The first gain setting to be evaluated will be the "full-scale" setting. Full-scale is defined as:

(1) calibration reference on
(2) attenuator off
(3) first IF stage gain (24 dB) on
(4) second IF stage gain (0 to 24 dB) at minimum It should be noted that the second IF stage gain corresponds to the variable gain amplifier 72, which is "forced" to a predetermined gain setting with the GSTUFF signal.

Hardware alignment procedures assures that the foregoing conditions will almost (but not quite) saturate the A/D converters 82, thereby facilitating offset and orthogonality measurements.

Measuring gain and orthogonality at the other possible settings is less straightforward. First, the proper attenuator setting for each gain level must be found. This is done by forcing the gain setting to the desired level, then selecting the minimum attenuator setting which does not saturate any of the A/D converters 82. Since a limited range of attenuator settings is available, some gain configurations will not be measurable by direct methods. Those that will be measured are listed here:

| 1st IF Gain | 2nd IF Gain | GAIN CODE | "Next" Code |
| --- | --- | --- | --- |
| 24 dB | 0 dB | 1 | — |
| 24 dB | 6 dB | 3 | 1 |
| 24 dB | 12 dB | 5 | 3 |
| 24 dB | 18 dB | 7 | 5 |
| 24 dB | 24 dB | 9 | 7 |

-continued

| 1st IF Gain | 2nd IF Gain | GAIN CODE | "Next" Code |
| --- | --- | --- | --- |
| 0 dB | 24 dB | 8 | 1 |

The GAIN CODE field is in the status word stored in the status register 163, while the state of the first IF gain (for the first IF subsystem 14 in FIG. 1) is signified by the signals IF1 SIG GAIN and IF1 REF GAIN. The second IF gain code is three bits (000 thru 100), signifying 0 through 24 dB of gain in the variable gain amplifier 72. The "Next" code listed is the gain code at which the same attenuator setting should be measured to yield a gain ratio for the two gain codes.

The gain ratio must be computed by matrix techniques, since it must account for phase shift as well as magnitude changes. It will thus result in a 2×2 matrix which can transform raw (offset corrected) inputs back to an orthogonality-and-gain-corrected phasor, with respect to the reference phase and A/D converter full scale.

The gain code matrices for the above gain settings are of the form:

$$c_g = \begin{bmatrix} (i_{00}-i_{0A}) & (i_{05}-i_{0F}) \\ (q_{00}-q_{0A})(q_{05}-q_{0F}) \end{bmatrix} \times \begin{bmatrix} (I_{00}-I_{0A}) & (I_{05}-I_{0F}) \\ (Q_{00}-Q_{0A})(Q_{05}-Q_{0F}) \end{bmatrix}^{-1}$$

where I and Q denote measurements taken at the gain code "g" whose matrix is being generated, and i and q denote measurements taken with the same attenuator setting but at the "Next" gain code.

The overall correction matrix ($C_g$) for a given gain code will be a product of these matrices, strung together from "Next" code to "Next" code to account for all of the gain steps encountered. The sequence in which these matrices are multiplied is important, and are as follows:

$C_1$ = measured directly (see above)
$C_3 = C_1 * c_3$
$C_5 = C_1 * c_3 * c_5$
$C_7 = C_1 * c_3 * c_5 * c_7$
$C_9 = C_1 * c_3 * c_5 * c_7 * c_9$
$C_8 = C_1 * c_8$
$C_6 = C_1 * c_8 * c_9^{-1}$
$C_4 = C_1 * c_8 * c_9^{-1} * c_7^{-1}$
$C_2 = C_1 * c_8 * c_9^{-1} * c_7^{-1} * c_5^{-1}$
$C_0 = C_1 * c_8 * c_9^{-1} * c_1^{-1} * c_5^{-1} * c_3^{-1}$ Note that the inverse matrices should be computed directly from the raw data, rather than by inverting the gain code matrices. Here is the formula for an inverse gain code matrix:

$$c_g^{-1} = \begin{bmatrix} (I_{00}-I_{0A}) & (I_{05}-I_{0F}) \\ (Q_{00}-Q_{0A})(Q_{05}-Q_{0F}) \end{bmatrix} \times \begin{bmatrix} (i_{00}-i_{0A}) & (i_{05}-i_{0F}) \\ (q_{00}-q_{0A})(q_{05}-q_{0F}) \end{bmatrix}^{-1}$$

As before, I and Q denote measurements taken at the gain code "g" whose matrix is being generated, and i and q denote measurements taken with the same attenuator setting but at the "Next" gain code.

Note that the full scale of the calibration reference signal may or may not correspond with the defined full scale of the measurement system. For purposes of the foregoing mathematical discussion, full scale of the calibration reference signal corresponds to a level approximately 24 dB below the defined full scale of the measurement system. It will be appreciated that the level of the calibration reference signal can actually vary within a wide range, but it is preferable to make the calibration reference signal full scale identical with the measurement system's full scale in order to minimize the effect of noise upon the calibration process.

The preferred embodiment of the present invention has been disclosed by way of example, and it will be understood that other modifications may occur to those skilled in the art without departing from the scope and the spirit of the appended claims.

What is claimed is:

1. An improved complex signal detection circuit responsive to an input signal having a predetermined frequency for converting said input signal into an inphase output signal and a quadrature phase output signal during a conversion cycle, comprising:

clock means for providing a clock signal having a frequency n times higher than said predetermined frequency of said input signal;

locking means for phase locking said clock signal and said input signal;

counter means for counting cycles of said clock signal modulo n and for providing count signals which subdivide a period of time corresponding to one cycle of said input signal;

memory means responsive to said count signals for providing inphase timing signals and quadrature phase timing signals, said quadrature phase timing signal being in quadrature with respect to said inphase timing signals during said conversion cycle;

a first switching circuit responsive to said inphase timing signals for providing I signal samples by switching between said input signal and an inverted input signal;

first integrating means for providing said inphase output signal by integrating said I signal samples for a predetermined number of periods of said input signal;

a second switching circuit responsive to said quadrature phase timing signals for providing Q signal samples by switching between said input signal and said inverted input signal; and second integrating means for providing said quadrature phase output signal by integrating said Q signal samples for said predetermined number of periods of said input signal.

2. The improved complex signal detection circuit of claim 1, further comprising resetting means for resetting said first integrating means and said second integrating means at the conclusion of said conversion cycle.

3. The improved complex signal detection circuit of claim 1, further comprising synchronizing means for synchronizing said inphase timing signals and said quadrature phase timing signals to said clock signal and for providing synchronized inphase timing signals and synchronized quadrature phase timing signals.

4. The improved complex signal detection circuit of claim 3, wherein said synchronizing means comprises a latch circuit having said inphase timings signals and quadrature phase timing signals for inputs, said synchronized inphase timing signals and said synchronized quadrature phase timing signals as outputs, and operative to switch said inputs to said outputs in response to an edge of said clock signal.

5. The improved complex signal detection circuit of claim 1, wherein said memory means comprises a read only memory (ROM).

6. The improved complex signal detection circuit of claim 1, wherein n is at least 100.

7. The improved complex signal detection circuit of claim 1, wherein said first switching circuit and said second switching circuit comprise:
  a unity gain inverter circuit for providing said inverted input signal;
  a positive switching FET for switching said input signal to an input node for said integrating means, said input node corresponding to said I signal sample said Q signal sample for said second switching circuit;
  a negative switching FET for switching said inverted input signal to said input node for said integrating means;
  a positive shunt FET for switching said input signal to ground during operation of said negative switching FET;
  a negative shunt FET for switching said inverted input signal to ground during operation of said positive switching FET;
  and said FETs being switched on an off by said inphase timing signals for said quadrature phase timing signals for said second switching circuit.

8. The improved complex signal detection circuit of claim 1, wherein said first integrating means and said second integrating means comprise:
  an operational amplifier having an integrating capacitor connected between an output terminal and an inverting input terminal, and
  said I or said Q signal sample being connected to said inverting input terminal and ground being connected to said noninverting input terminal.

9. The improved complex signal detection circuit of claim 8, further comprising resetting means comprising at least one FET connected across the terminals of said integrating capacitor, said FET being operative in response to a resetting signal to discharge said integrating capacitor, and
  wherein said memory means provides said resetting signal at the conclusion of said predetermined number of periods of said input signal.

10. The improved complex signal detection circuit of claim 1, further comprising calibration means for calibrating said inphase and said quadrature phase output signals, said calibration means comprising:
  calibration signal means for providing a calibration signal having a known magnitude and a known phase relative to said clock signal;
  phase offset signal storing means for storing a predetermined phase offset corresponding to a desired effective phase shift for said calibration signal;
  said memory means being responsive to said count signals and to said predetermined phase offset stored in said phase offset signal storing means for generating phase-shifted inphase timing signals and phase-shifted quadrature phase timing signals,
  whereby said inphase output signal and said quadrature phase output signals are generated with respect to said phase-shifted inphase timing signals and said phase-shifted quadrature phase timing signals so as to cause an effective shift in phase of said calibration signal without an actual phase shift in said calibration signal.

11. The improved complex signal detection circuit of claim 10, further comprising means for providing a plurality of said predetermined phase offsets during a calibration cycle so as to generate a set of inphase and quadrature phase values for a set of predetermined phase offsets, and
  computing means responsive to said set of inphase and quadrature phase values for computing correction values to be utilized for correcting said inphase output signal and said quadrature output signal.

12. The improved complex signal detection circuit of claim 11, wherein said plurality of said predetermined phase offsets comprises 0°, 90°, 180°, and 270°.

13. The improved complex signal detection circuit of claim 1, further comprising phase walking means operative to cause said inphase output signal and said quadrature phase output signal to shift in phase by a predetermined incremental angular amount in response to a phase walk command.

14. The improved complex signal detection circuit of claim 13, wherein said phase walking means comprises a gate for inhibiting said counter means from counting for one cycle of said clock signal, thereby effectively shifting the generation of said inphase timing signals and said quadrature phase timing signals by an amount corresponding to one clock cycle, for each said conversion cycle.

15. An improved autoranging circuit for selecting one of a plurality of predetermined gain stages of amplification for an input signal, comprising:
  analog to digital (A/D) converter means for providing a digital signal sample of said input signal;
  timing means for timing a predetermined number of accumulation cycles;
  memory means responsive to said digital signal sample of said input signal and an accumulated input signal value for providing as an output, for each one of said accumulation cycles, a sum of absolute values of said digital signal sample value and said accumulated input signal from a previous accumulation cycle;
  storage means for storing said sum from said memory means as said accumulated input signal value for a next accumulation cycle;
  programmed logic means responsive to said accumulated input signal value after said predetermined number of said accumulation cycles for providing gain selection signals; and
  a selectively variable gain amplifier responsive to said gain selection signals for selecting one of said plurality of predetermined gain stages of amplification for said input signal, thereby providing a gain ranged output signal.

16. The improved autoranging circuit of claim 15, wherein said A/D converter is a flash converter.

17. The improved autoranging circuit of claim 15, wherein said memory means comprises a read only memory (ROM).

18. The improved autoranging circuit of claim 15, wherein said input signal is lower than a predetermined frequency, and wherein said predetermined number of accumulation cycles corresponds to an interval of time less than one period of said predetermined frequency.

19. The improved autoranging circuit of claim 18, wherein said predetermined frequency is about 100 kHz, and wherein said predetermined number of accumulation cycles is at least 50.

20. The improved autoranging circuit of claim 15, further comprising signal processing means for further processing said gain ranged output signal during a cycle of a frequency corresponding to the frequency of said input signal, and wherein autoranging circuit is operative to provide said gain ranged output signal prior to each cycle of said signal processing means.

21. The improved autoranging circuit of claim 20, wherein said signal processing means comprises complex signal means for providing an inphase and a quadrature phase signal corresponding to each cycle of said gain ranged output signal, and analog to digital converter means for digitizing said inphase and said quadrature phase signals, and wherein said autoranging circuit is operative prior to each cycle of said signal processing means.

22. A method for calibrating a complex signal detection means, said complex signal detection means providing inphase and quadrature phase output signals in response to an input signal, comprising the steps of:

in response to a calibration command, generating a calibration reference signal;

providing said calibration reference signal as said input signal to said complex signal detection means;

generating timing signals for causing said complex signal detection means to convert said input signal into an inphase output signal and a quadrature phase output signal;

in response to said calibration command, providing a phase offset signal corresponding to a predetermined phase offset for said calibration reference signal;

in response to said phase offset signal, altering the timing of said timing signals for said complex signal detection means so that said complex signal detection means provides phase-offset inphase and quadrature phase output signals which are shifted in phase by an amount corresponding to said predetermined phase offset;

providing said phase-offset inphase and quadrature phase output signals to a computing device; and calculating a calibration correction for gain and orthogonality for said complex signal detection means in response to said phase-offset inphase and quadrature phase output signals.

23. The method of claim 22, wherein the step of providing a phase offset signal comprises the steps of providing, in succession for a single calibration, a set of said phase offset signals, each one of said set of said phase offset signals corresponding to a different predetermined phase offset for said calibration reference signal.

24. The method of claim 22, wherein the method is performed in a radio frequency (RF) receiver.

25. The method of claim 24, wherein the RF receiver includes a local oscillator (LO) stage and an intermediate frequency (IF) stage, and wherein the complex signal detection means is associated with said IF stage.

26. The method of claim 25, wherein said LO stage provides said calibration reference signal.

27. The method of claim 26, wherein said calibration reference signal is phase-locked to a timing reference oscillator in said LO stage so as to provide a phase reference.

28. The method of claim 25, wherein the RF receiver is a measurement receiver including a measured signal channel and a reference signal channel, and wherein the method is performed for both said measured signal channel and said reference signal channel, and wherein said calibration reference signal is provided to both said measured signal channel and said reference signal channel.

29. The method of claim 22, wherein said complex signal detection means comprises an FET switched demodulator, and said timing signals for said complex signal detection means comprise signals for switching a plurality of FETs in said demodulator, and wherein the step of altering the timing of said timing signals comprises altering the timing of the signals for switching said FETs so that said complex signal detection means is operative as if there were a phase offset in said calibration reference signal.

30. The method of claim 29, wherein the steps of generating timing signals for said complex signal detection means and altering the timing of said timing signals comprises the steps of:

providing a precision timed clock signal;

providing a counter for counting occurrences of said clock signal;

providing a read only memory (ROM) responsive on some of its address lines to the states of said counter for generating said timing signals for said FETs from a first portion of memory;

providing said phase offset signal as other inputs for other address lines of said ROM;

in response to said phase offset signal, providing altered timing signals for said FETs from a second portion of memory in said ROM, whereby said altered timing signals represent an effective shift in phase of said calibration reference signal when a phase offset signal is provided to said ROM.

31. An apparatus for calibration of a complex signal detection means, said complex signal detection means providing inphase and quadrature phase output signals in response to an input signal, comprising:

means responsive to a calibration command for generating a calibration reference signal;

means for providing said calibration reference signal as said input signal to said complex signal detection means;

timing signal means for generating timing signals for causing said complex signal detection means to convert said input signal into an inphase output signal and a quadrature phase output signal;

phase offset signal means responsive to said calibration command for providing a phase offset signal corresponding to a predetermined phase offset for said calibration reference signal;

timing signal altering means responsive to said phase offset signal for altering the timing of said timing signals for said complex signal detection means so that said complex signal detection means provides phase-offset inphase and quadrature phase output signals which are shifted in phase by an amount corresponding to said predetermined phase offset;

means for providing said phase-offset inphase and quadrature phase output signals to a computing device; and means for calculating a calibration correction for gain and orthogonality for said complex signal detection means in response to said phase-offset inphase and quadrature phase output signals.

32. The calibration apparatus of claim 31, wherein said phase offset signal means comprises means for providing, in succession for a single calibration, a set of phase offset signals, each one of said set of said phase offset signals corresponding to a different predetermined phase offset for said calibration reference signal.

33. The calibration apparatus of claim 31, wherein said apparatus is utilized in a radio frequency (RF) receiver.

34. The calibration apparatus of claim 33, wherein said RF receiver includes a local oscillator (LO) stage and an intermediate frequency (IF) stage, and wherein said complex signal detection means is associated with said IF stage.

35. The calibration apparatus of claim 34, wherein said LO stage provides said calibration reference signal.

36. The calibration apparatus of claim 34, wherein said RF receiver is a measurement receiver including a measured signal channel and a reference signal channel, and wherein said calibration apparatus is utilized in both said measured signal channel and said reference signal channel, and wherein said calibration reference signal is provided to both said measured signal channel and said reference signal channel.

37. The calibration apparatus of claim 31, wherein said complex signal detection means comprises an FET switched demodulator, wherein said timing signals for said complex signal detection means comprise signals for switching a plurality of FETs in said demodulator, and wherein said timing signal altering means comprises means for altering the timing of signals for switching said FETs so that said complex signal detection means is operative as if there were a phase offset in said calibration reference signal.

38. The calibration apparatus of claim 31, wherein said timing signal means and said timing signal altering means comprises:

means for providing a precision timed clock signal;
means for counting occurrences of said clock signal;
a read only memory (ROM) responsive on some of its address lines to the states of said counting means for generating said timing signals from a first portion of memory;
means providing said phase offset signal as other inputs for other address lines of said ROM; and
said ROM being responsive to said phase offset signal for providing said altered timing signals from a second portion of memory in said ROM,
whereby said altered timing signals represent an effective shift in phase of said calibration reference signal when a phase offset signal is provided to said ROM.

39. The calibration apparatus of claim 38, wherein said complex signal detection means comprises an FET switched commutating demodulator, and wherein said timing signals and said altered timing signals comprise signals for switching a plurality of FETs an a sequence to generate said inphase and said quadrature phase output signals.

40. The calibration apparatus of claim 39, further comprising deskewing means connected to the outputs of said ROM for synchronizing said timing signals and said altered timing signals to said clock signal prior to connection for switching said FETs.

41. An apparatus for calibration of a complex signal detection means, said complex signal detection means providing inphase and quadrature phase output signals in response to an input signal, comprising:

means for providing a precision timed clock signal;
a counter for counting occurrences of said clock signal;
a read only memory (ROM) responsive on some of its address lines to the states of said counter for generating timing signals from a first portion of memory;
means responsive to a calibration command for generating a calibration reference signal;
means for providing said calibration reference signal as said input signal to said complex signal detection means;
phase offset signal means responsive to said calibration command for providing a phase offset signal as other inputs for other address lines of said ROM, said phase offset signal corresponding to a predetermined phase offset for said calibration reference signal;
said ROM being responsive to said phase offset signal for providing altered timing signals from a second portion of memory in said ROM;
means for synchronizing said timing signals and said altered timing signals from said ROM to said precision timed clock signal;
switching means responsive to timing signals synchronized by said synchronizing means for converting said input signal into inphase and quadrature phase output signals, said switching means being responsive to altered timing signals synchronized by said synchronizing means for converting said input signal into phase-offset inphase and quadrature phase output signals which are shifted in phase by an amount corresponding to said predetermined phase offset;
digital to analog (D/A) converter means for converting said inphase and quadrature phase output signals and said phase-offset inphase and quadrature phase output signals into digital inphase and quadrature phase output signals and digital phase-offset inphase and quadrature phase output signals;
means for providing said digital inphase and quadrature phase output signals and said digital phase-offset inphase and quadrature phase output signals to a computing means; and
means responsive to said digital inphase and quadrature phase output signals and said digital phase-offset inphase and quadrature phase output signals for computing a calibration correction for gain and orthogonality for signals provided by said switching means in response to said digital inphase and quadrature phase output signals and said digital phase-offset inphase and quadrature phase output signals,
whereby said altered timing signals represent an effective shift in phase of said calibration reference signal when a phase offset signal is provided to said ROM.

42. The calibration apparatus of claim 41, wherein said apparatus is utilized in an RF receiver including a local oscillator (LO) stage, and wherein said calibration reference signal is phase locked to a timing reference oscillator associated with said LO stage so as to provide a phase reference.

43. A signal processing circuit responsive to an input signal having a predetermined frequency and a wide dynamic range for providing an inphase output signal and a quadrature phase output signal corresponding to said input signal, comprising:

autoranging means for selecting one of a plurality of predetermined gain stages of amplification for said input signal and for providing a gain ranged output signal;

a complex signal detection circuit for converting said gain ranged input signal into an inphase output signal and a quadrature phase output signal during a conversion cycle; and calibration signal means responsive to a calibration input signal provided during a calibration cycle for providing calibration correction signals to a utilization apparatus which utilizes said calibration correction signals to correct said inphase output signal and said quadrature phase output signal.

44. The circuit of claim 43, further comprising control means for controlling the operation of said autoranging means to provide said gain ranged output signal prior to each conversion cycle of said complex signal detection circuit.

45. The circuit of claim 43, wherein said autoranging means comprises:
  input buffer means for receiving and buffering said input signal;
  analog to digital (A/D) converter means for providing a digital signal sample of said input signal;
  timing means for timing a predetermined number of accumulation cycles;
  memory means responsive to said digital signal sample of said input signal and an accumulated input signal value for providing as an output, for each one of said accumulation cycles, a sum of the absolute value of said digital signal sample and said accumulated input signal value from a previous accumulation cycle;
  storage means for storing said sum from said memory means as said accumulated input signal value for a next accumulation cycle;
  programmed logic means responsive to said accumulated input signal value after said predetermined number of said accumulation cycles for providing gain selection signals; and
  a selectively variable gain amplifier responsive to said gain selection signals for selecting one of said plurality of predetermined gain stages of amplification for said input signal, thereby providing said gain ranged input signal.

46. The circuit of claim 43, wherein said complex signal detection circuit comprises:
  clock means for providing a clock signal having a frequency n times higher than said predetermined frequency of said input signal;
  locking means for phase locking said clock signal and said input signal;
  counter means for counting cycles of said clock signal modulo n and for providing count signals which subdivide a period of time corresponding to one cycle of said input signal;
  memory means responsive to said count signals for providing inphase timing signals and quadrature phase timing signals, said quadrature phase timing signals being in quadrature with respect to said inphase timing signals during said conversion cycle;
  a first switching circuit responsive to said inphase timing signals for providing I signal samples by switching between said input signal and an inverted input signal;
  first integrating means for providing said inphase output signal by integrating said I signal samples for a predetermined number of periods of said input signal;
  a second switching circuit responsive to said quadrature phase timing signals for providing Q signal samples by switching between said input signal and said inverted input signal; and
  second integrating means for providing said quadrature phase output signal by integrating said Q signal samples for said predetermined number of periods of said input signal.

47. The circuit of claim 43, wherein said calibration signal means comprises:
  means for providing a precision timed clock signal;
  a counter for counting occurrences of said clock signal;
  a read only memory (ROM) responsive on some of its address lines to the states of said counter for generating timing signals from a first portion of memory;
  means responsive to a calibration command for generating a constant phase calibration reference signal;
  means for providing said calibration reference signal as said input signal to said complex signal detection means;
  phase offset signal means responsive to said calibration command for providing a phase offset signal as other inputs for other address lines of said ROM, said phase offset signal corresponding to a predetermined phase offset for said calibration reference signal;
  said ROM being responsive to said phase offset signal for providing altered timing signals from a second portion of memory in said ROM;
  means for synchronizing said timing signals and said altered timing signals from said ROM to said precision timed clock signal;
  switching means responsive to timing signals synchronized by said synchronizing means for converting said input signal into inphase and quadrature phase output signals, said switching means being responsive to altered timing signals synchronized by said synchronizing means for converting said input signal into phase-offset inphase and quadrature phase output signals which are shifted in phase by an amount corresponding to said predetermined phase offset;
  digital to analog (D/A) converter means for converting said inphase and quadrature phase output signals and said phase-offset inphase and quadrature phase output signals into digital inphase and quadrature phase output signals and digital phase-offset inphase and quadrature phase output signals;
  means for providing said digital inphase and quadrature phase output signals and said digital phase-offset inphase and quadrature phase output signals to said utilization means; and
  means associated with said utilization means responsive to said digital inphase and quadrature phase output signals and said digital phase-offset inphase and quadrature phase output signals for computing a calibration correction for gain and orthogonality for signals provided by said switching means in response to said digital inphase and quadrature phase output signals and said digital phase-offset inphase and quadrature phase output signals,
  whereby said altered timing signals represent an effective shift in phase of said calibration reference signal when a phase offset signal is provided to said ROM.

48. A commutating demodulator circuit responsive to an input signal at a predetermined frequency for providing an output signal referenced to the phase of a known phase reference signal during a conversion cycle, comprising:

clock means for providing a clock signal having a frequency n times higher than said predetermined frequency of said input signal;
  locking means for phase locking said input signal and said clock signal;
  counter means for counting cycles of said clock signal modulo n and for providing count signals which subdivide a period of time corresponding to one cycle of said input signal;
  memory means responsive to said count signals for providing timing signals during said conversion cycle, said timing signals comprising a positive switching signal, a negative switching signal, a positive shunt signal, and a negative shunt signal, said positive switching signal and said negative switching signal being 180° out of phase with respect to each other, and said positive shunt signal and said negative shunt signal being 180° out of phase with respect to each other;
  first switching means responsive to said positive switching signal for switching said input signal to an integrating node;
  second switching means responsive to said negative switching signal for switching an inverted input signal to said integrating node;
  third switching means responsive to said positive shunt signal for holding the input voltage of said first switching means near ground during said negative switching signal;
  fourth switching means responsive to said negative shunt signal for holding the input voltage of said second switching means near ground during said positive switching signal; and
  synchronizing means for synchronizing said timing signals to said clock signal.

49. The commutating demodulator circuit of claim 48, wherein said synchronizing means comprises a latch circuit having said timing signals from said memory means as inputs, having said positive switching signal, said negative switching signal, said positive shunt signal, and said negative shunt signal as outputs, and operative to switch said inputs to said outputs in response to an edge of said clock signal.

50. The commutating demodulator circuit of claim 49, wherein said first switching means, said second switching means, said third switching means, and said fourth switching means comprise FETs, and wherein said outputs of said latch circuit directly drive the gate terminals of said FETs.

51. The commutating demodulator circuit of claim 48, wherein said circuit comprises a complex signal detection circuit responsive to an input signal having a predetermined frequency for converting said input signal into an inphase output signal and a quadrature phase output signal during said conversion cycle.

* * * * *